US012192952B2

(12) United States Patent
Gummadi et al.

(10) Patent No.: US 12,192,952 B2
(45) Date of Patent: Jan. 7, 2025

(54) EFFICIENT POSITIONING ENHANCEMENT FOR DYNAMIC SPECTRUM SHARING

(71) Applicant: QUALCOMM Incorporated, San Diego, CA (US)

(72) Inventors: Bapineedu Chowdary Gummadi, Hyderabad (IN); Stephen William Edge, Escondido, CA (US); Hem Agnihotri, Benares (IN)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/323,650

(22) Filed: May 18, 2021

(65) Prior Publication Data

US 2021/0352610 A1    Nov. 11, 2021

Related U.S. Application Data

(62) Division of application No. 16/869,738, filed on May 8, 2020, now Pat. No. 11,044,693.

(51) Int. Cl.
*H04W 64/00* (2009.01)
*G01S 5/02* (2010.01)
(Continued)

(52) U.S. Cl.
CPC ......... *H04W 64/003* (2013.01); *G01S 5/0236* (2013.01); *G01S 5/06* (2013.01);
(Continued)

(58) Field of Classification Search
CPC ... H04W 52/325; H04W 52/40; H04W 4/029; H04W 52/146; H04W 64/006;
(Continued)

(56) References Cited

U.S. PATENT DOCUMENTS 9,258,718 B2 *  2/2016  Ji ..................... H04W 72/0446
9,591,605 B2 *  3/2017  Stern-Berkowitz ... H04W 24/10
(Continued)

FOREIGN PATENT DOCUMENTS

CN        106848608 B  *  3/2020  ............. H01Q 1/521
WO       2018102587        6/2018
(Continued)

OTHER PUBLICATIONS

International Search Report and Written Opinion—PCT/US2021/023463—ISA/EPO—Jun. 10, 2021.
(Continued)

*Primary Examiner* — David Q Nguyen
(74) *Attorney, Agent, or Firm* — Sunstein LLP

(57) ABSTRACT

Techniques are provided for transmitting Positioning Reference Signals (PRSs) in cells supporting two different Radio Access Technologies (RATs), where the two RATs (e.g. 4G LTE and 5G NR) employ dynamic spectrum sharing. To avoid interference between the PRSs and between the two RATs, the PRSs may be time aligned to the same set of PRS positioning occasions, and may be assigned orthogonal characteristics such as different muting patterns, orthogonal code sequences, different frequency shifts or different frequency hopping. UEs supporting both RATs may be enabled to measure PRSs for both RATs. UEs supporting only one RAT (e.g. 4G LTE) may be enabled to measure PRSs for just this RAT. A location server such as an LMF, E-SMLC or SLP may provide assistance data to UEs, and request measurements from UEs, for PRSs in one or both RATs.

32 Claims, 13 Drawing Sheets

(51) Int. Cl.
  *G01S 5/06* (2006.01)
  *H04L 5/00* (2006.01)
  *H04W 16/14* (2009.01)
  *H04W 24/10* (2009.01)
  *H04W 88/06* (2009.01)

(52) U.S. Cl.
  CPC ........... *H04L 5/0048* (2013.01); *H04W 16/14* (2013.01); *H04W 24/10* (2013.01); *H04W 88/06* (2013.01)

(58) Field of Classification Search
  CPC ..... H04W 76/28; H04W 24/08; H04W 72/23; H04W 68/005; H04W 74/0866; H04W 74/0841; H04W 16/14; H04W 24/10; H04W 64/003; H04W 88/06; H04W 64/00; H04W 16/28; H04L 5/0048; H04L 27/261; H04L 27/2613; H04L 5/0051; H04L 27/26132; H04L 5/0023; H04L 5/001; H04L 27/0006; H04L 5/0053; G01S 5/0036; G01S 5/10; G01S 5/0205; G01S 5/0236; G01S 5/06; G01S 5/14; G01S 5/0063; G01S 5/0048; G01S 7/0408; H04B 7/0695
  USPC .................................. 370/328, 329, 330, 331
  See application file for complete search history.

(56) References Cited

U.S. PATENT DOCUMENTS

| | | | |
|---|---|---|---|
| 10,064,156 B2 * | 8/2018 | Stern-Berkowitz | G01S 5/10 |
| 10,638,444 B2 | 4/2020 | Yerramalli et al. | |
| 11,044,693 B1 | 6/2021 | Gummadi | |
| 2015/0011240 A1 | 1/2015 | Kiao et al. | |
| 2016/0174109 A1 | 6/2016 | Yerramalli et al. | |
| 2016/0205499 A1 | 7/2016 | Davydov et al. | |
| 2018/0098258 A1 | 4/2018 | Annam et al. | |
| 2018/0132061 A1 * | 5/2018 | Bitra | G01S 5/10 |
| 2018/0139763 A1 * | 5/2018 | Bitra | H04W 72/542 |
| 2018/0324740 A1 | 11/2018 | Edge et al. | |
| 2018/0343635 A1 | 11/2018 | Edge et al. | |
| 2019/0037529 A1 * | 1/2019 | Edge | H04L 5/005 |
| 2019/0089498 A1 | 3/2019 | Pelletier et al. | |
| 2019/0132816 A1 | 5/2019 | Xue et al. | |
| 2019/0327706 A1 | 10/2019 | Agnihotri et al. | |
| 2020/0351815 A1 * | 11/2020 | Kim | G01S 11/04 |
| 2021/0058890 A1 * | 2/2021 | Akkarakaran | G01S 5/0236 |
| 2021/0320769 A1 * | 10/2021 | Cha | H04W 48/12 |
| 2021/0345130 A1 * | 11/2021 | Bi | H04W 24/10 |
| 2022/0123886 A1 * | 4/2022 | Munier | G01S 5/0205 |
| 2022/0190885 A1 * | 6/2022 | Nakayama | H04B 7/06 |
| 2022/0201522 A1 * | 6/2022 | Tao | H04W 76/28 |
| 2022/0373635 A1 * | 11/2022 | Bao | H04W 64/00 |
| 2022/0381922 A1 * | 12/2022 | Ren | H04W 56/0015 |

FOREIGN PATENT DOCUMENTS

| | | |
|---|---|---|
| WO | 2019027595 A1 | 2/2019 |
| WO | 2020050646 A1 | 3/2020 |

OTHER PUBLICATIONS

"3rd Generation Partnership Project, Technical Specification Group Radio Access Network; NG Radio Access Network (NG-RAN); Stage 2 Functional Specification of User Equipment (UE) Positioning in NG-RAN (Release 16)", 3GPP Draft, Draft 38305-G00 V2, 3rd Generation Partnership Project, Mobile Competence Centre, 650, Route Des Lucioles, F-06921 Sophia-Antipolis Cedex, France, Apr. 7, 2020 (Apr. 7, 2020), XP051869439, 125 Pages, Sections 4 and 5.
Taiwan Search Report—TW110110466—TIPO—Sep. 9, 2024.
"Wireless Technology Evolution Transition from 4G to 5G", 3GPP Releases 14 to 16, 5G Americas Whitepaper, Oct. 2018, 271 Pages.

\* cited by examiner

EFFICIENT POSITIONING ENHANCEMENT FOR DYNAMIC SPECTRUM SHARING

CROSS-REFERENCE TO RELATED APPLICATION

This application is a divisional of U.S. patent application Ser. No. 16/869,738, filed on May 8, 2020, entitled "EFFICIENT POSITIONING ENHANCEMENT FOR DYNAMIC SPECTRUM SHARING," which is assigned to the assignee hereof, and the entire contents of which are hereby incorporated herein by reference for all purposes.

BACKGROUND

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine times of arrival, time differences of arrival and/or receive time-transmit time differences. Combining these measurements with known locations for the base stations and known transmission times from each base station may enable location of the mobile device using such position methods as Observed Time Difference Of Arrival (OTDOA), Round Trip signal propagation Time (RTT), or Enhanced Cell ID (ECID).

To further help location determination (e.g. for OTDOA or RTT), Positioning Reference Signals (PRS) may be transmitted by base stations in order to increase both measurement accuracy and the number of different base stations for which timing measurements can be obtained by a mobile device. The PRS signal transmissions may be radio access technology dependent such that one type of PRS may be compatible with 4G Long Term Evolution (LTE) technologies, and another type of PRS may be compatible with newer 5G New Radio (NR) technologies. Dynamic Spectrum Sharing (DSS) is a technology that allows the deployment of both 4G LTE and 5G NR in the same frequency band. Positioning services that are compatible with DSS technologies are becoming increasingly important as wireless networks must serve mobile devices that are compatible with either 4G LTE and/or 5G NR.

SUMMARY

An example method, at a mobile device, to support positioning of the mobile device with dynamic spectrum sharing according to the disclosure includes obtaining a first set of location measurements for first positioning reference signals (PRSs) transmitted in a first plurality of cells, the first plurality of cells using a first radio access technology (RAT), obtaining a second set of location measurements for second PRSs transmitted in a second plurality of cells, the second plurality of cells using a second RAT, wherein the first RAT and the second RAT are different radio access technologies operating on the same radio frequency band, and providing the first set of location measurements and the second set of location measurements to a network entity, wherein the network entity determines a location of the mobile device based at least in part on the first set of location measurements and the second set of location measurements.

Implementations of such a method may include one or more of the following features. The first RAT may be 4G Long Term Evolution (LTE) and the second RAT may be 5G New Radio (NR). The network entity may be the mobile device. The network entity may be a location server comprising a Location Management Function (LMF), an Enhanced Serving Mobile Location Center (E-SMLC), or a Secure User Plane Location (SUPL) Location Platform (SLP). The first set of location measurements and the second set of location measurements may each comprise measurements comprising at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these. Each PRS in the first PRSs and the second PRSs may comprise a sequence of PRS positioning occasions, such that the sequence of PRS positioning occasions for each PRS occur at the same times as the sequence of PRS positioning occasions for each of other PRSs in the first PRSs and the second PRSs. Each PRS in the first PRSs and the second PRSs may include orthogonal characteristics, such that the orthogonal characteristics reduce interference between the each PRS and other PRSs in the first PRSs and the second PRSs. The orthogonal characteristics may include at least one of a distinct frequency shift, an orthogonal PRS code sequence, a distinct frequency hopping sequence, a distinct muting pattern, or some combination of these. The orthogonal characteristics may include a distinct muting pattern, wherein the each PRS is transmitted during PRS positioning occasions in which PRS is not transmitted for some other PRSs in the first PRSs and the second PRSs, wherein the each PRS is not transmitted during PRS positioning occasions in which PRS is transmitted for at least some of the some other PRSs in the first PRSs and the second PRSs. The method may include receiving assistance data from a location server, the assistance data including a configuration of each PRS in the first PRSs and the second PRSs, the configuration including an indication of the sequence of PRS positioning occasions and the orthogonal characteristics for the each PRS, wherein the first set of location measurements and the second set of location measurements are based in part on the configuration of each PRS in the first PRSs and the second PRSs. The radio frequency band may include frequencies in a range of 600 MHz to 700 MHz or in a range of 2.5 GHz to 3.5 GHz.

An example apparatus according to the disclosure include a memory, a transceiver, a processor communicatively coupled to the memory and the transceiver and configured to obtain a first set of location measurements for first positioning reference signals (PRSs) transmitted in a first plurality of cells, the first plurality of cells using a first radio access technology (RAT), obtain a second set of location measurements for second PRSs transmitted in a second plurality of cells, the second plurality of cells using a second RAT, wherein the first RAT and the second RAT are different radio access technologies operating on the same radio frequency band, and provide the first set of location measurements and the second set of location measurements to a network entity, wherein the network entity determines a location of the apparatus based at least in part on the first set of location measurements and the second set of location measurements.

An example apparatus according to the disclosure includes means for obtaining a first set of location measurements for first positioning reference signals (PRSs) transmitted in a first plurality of cells, the first plurality of cells using a first radio access technology (RAT), means for obtaining a second set of location measurements for second PRSs transmitted in a second plurality of cells, the second plurality of cells using a second RAT, wherein the first RAT and the second RAT are different radio access technologies operating on the same radio frequency band, and means for providing the first set of location measurements and the second set of location measurements to a network entity, wherein the network entity determines a location of a mobile device based at least in part on the first set of location measurements and the second set of location measurements.

An example non-transitory processor-readable storage medium comprising processor-readable instructions configured to cause one or more processors to support positioning of a mobile device with dynamic spectrum sharing according to the disclosure includes code for obtaining a first set of location measurements for first positioning reference signals (PRSs) transmitted in a first plurality of cells, the first plurality of cells using a first radio access technology (RAT), code for obtaining a second set of location measurements for second PRSs transmitted in a second plurality of cells, the second plurality of cells using a second RAT, wherein the first RAT and the second RAT are different radio access technologies operating on the same radio frequency band, and code for providing the first set of location measurements and the second set of location measurements to a network entity, wherein the network entity determines a location of the mobile device based at least in part on the first set of location measurements and the second set of location measurements.

An example method, at a network server, to support positioning of a mobile device with dynamic spectrum sharing includes receiving a first set of location measurements obtained by the mobile device for first positioning reference signals (PRSs) transmitted in a first plurality of cells, the first plurality of cells using a first radio access technology (RAT), receiving a second set of location measurements obtained by the mobile device for second PRSs transmitted in a second plurality of cells, the second plurality of cells using a second RAT, wherein the first RAT and the second RAT are different radio access technologies operating on the same radio frequency band, and determining a location of the mobile device based at least in part on the first set of location measurements and the second set of location measurements.

Implementations of such method may include one or more of the following features. The first RAT may be 4G Long Term Evolution (LTE) and the second RAT may be 5G New Radio (NR). The network server may be a Location Management Function (LMF), an Enhanced Serving Mobile Location Center (E-SMLC), or a Secure User Plane Location (SUPL) Location Platform (SLP). The first set of location measurements and the second set of location measurements may each comprise measurements comprising at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these. Each PRS in the first PRSs and the second PRSs may include a sequence of PRS positioning occasions, wherein the sequence of PRS positioning occasions for each PRS occur at the same times as the sequence of PRS positioning occasions for each of other PRSs in the first PRSs and the second PRSs. Each PRS in the first PRSs and the second PRSs may include orthogonal characteristics, wherein the orthogonal characteristics reduce interference between the each PRS and other PRSs in the first PRSs and the second PRSs. The orthogonal characteristics may include at least one of a distinct frequency shift, an orthogonal PRS code sequence, a distinct frequency hopping sequence, a distinct muting pattern, or some combination of these. The orthogonal characteristics may include a distinct muting pattern, such that each PRS is transmitted during PRS positioning occasions in which PRS is not transmitted for some other PRSs in the first PRSs and the second PRSs, such that the each PRS is not transmitted during PRS positioning occasions in which PRS is transmitted for at least some of the some other PRSs in the first PRSs and the second PRSs. The method may include sending assistance data to the mobile device, the assistance data may include a configuration of each PRS in the first PRSs and the second PRSs, the configuration including an indication of the sequence of PRS positioning occasions and the orthogonal characteristics for the each PRS, such that the first set of location measurements and the second set of location measurements are obtained by the mobile device based in part on the configuration of each PRS in the first PRSs and the second PRSs. The radio frequency band may include frequencies in a range of 600 MHz to 700 MHz or in a range of 2.5 GHz to 3.5 GHz.

An example apparatus according to the disclosure includes a memory, a transceiver, a processor communicatively coupled to the memory and the transceiver and configured to receive a first set of location measurements obtained by a mobile device for first positioning reference signals (PRSs) transmitted in a first plurality of cells, the first plurality of cells using a first radio access technology (RAT), receive a second set of location measurements obtained by the mobile device for second PRSs transmitted in a second plurality of cells, the second plurality of cells using a second RAT, wherein the first RAT and the second RAT are different radio access technologies operating on the same radio frequency band, and determine a location of the mobile device based at least in part on the first set of location measurements and the second set of location measurements.

An example apparatus according to the disclosure includes means for receiving a first set of location measurements obtained by a mobile device for first positioning reference signals (PRSs) transmitted in a first plurality of cells, the first plurality of cells using a first radio access technology (RAT), means for receiving a second set of location measurements obtained by the mobile device for second PRSs transmitted in a second plurality of cells, the second plurality of cells using a second RAT, wherein the first RAT and the second RAT are different radio access technologies operating on the same radio frequency band, and means for determining a location of the mobile device based at least in part on the first set of location measurements and the second set of location measurements.

An example non-transitory processor-readable storage medium comprising processor-readable instructions configured to cause one or more processors to support positioning of a mobile device with dynamic spectrum sharing according to the disclosure includes code for receiving a first set of location measurements obtained by the mobile device for first positioning reference signals (PRSs) transmitted in a first plurality of cells, the first plurality of cells using a first radio access technology (RAT), code for receiving a second set of location measurements obtained by the mobile device for second PRSs transmitted in a second plurality of cells, the second plurality of cells using a second RAT, wherein the first RAT and the second RAT are different radio access technologies operating on the same radio frequency band, and code for determining a location of the mobile device based at least in part on the first set of location measurements and the second set of location measurements.

An example method, at a wireless node, to facilitate positioning of a mobile device with dynamic spectrum sharing according to the disclosure includes transmitting a positioning reference signal (PRS) in a cell of the wireless node, the cell configured to operate with a first radio access technology (RAT), wherein the PRS is orthogonal to PRSs transmitted in a plurality of neighboring cells configured to operate with a second RAT, wherein the first RAT and the second RAT are different radio access technologies operating on the same radio frequency band, receiving a request from a location server for configuration information for the PRS, and sending the configuration information for the PRS to the location server, wherein the configuration information enables location measurements of the PRS by the mobile device, wherein the location measurements enable determination of a location of the mobile device.

Implementations of such a method may include one or more of the following features. The wireless node may be an evolved NodeB (eNB), such that the first RAT may be 4G Long Term Evolution (LTE), the second RAT may be 5G New Radio (NR), and the location server may be an Enhanced Serving Mobile Location Center (E-SMLC) or a Secure User Plane Location (SUPL) Location Platform (SLP). The wireless node may be a New Radio (NR) NodeB (gNB), wherein the first RAT is 5G NR, wherein the second RAT is 4G Long Term Evolution (LTE), wherein the location server may be a Location Management Function (LMF) or a Secure User Plane Location (SUPL) Location Platform (SLP). The wireless node may be a Next Generation evolved NodeB (ng-eNB), the first RAT may be Long Term Evolution (LTE), wherein the second RAT may be 5G New Radio (NR), wherein the location server may be a Location Management Function (LMF) or a Secure User Plane Location (SUPL) Location Platform (SLP). The location measurements may comprise measurements of at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these. The PRS may comprise a sequence of PRS positioning occasions, wherein the sequence of PRS positioning occasions occur at the same times as PRS positioning occasions for each of the PRSs transmitted in the plurality of neighboring cells. The PRS may include orthogonal characteristics, such that the orthogonal characteristics reduce interference between the PRS and the PRSs transmitted in the plurality of neighboring cells. The orthogonal characteristics may include at least one of a distinct frequency shift, an orthogonal PRS code sequence, a distinct frequency hopping sequence, a distinct muting pattern, or some combination of these. The orthogonal characteristics may include a distinct muting pattern, wherein the PRS is transmitted during PRS positioning occasions in which PRS is not transmitted in at least some first cells of the plurality of neighboring cells, wherein the PRS is not transmitted during PRS positioning occasions in which PRS is transmitted in at least some second cells of the plurality of neighboring cells. Receiving the request from the location server and sending the configuration information to the location server may use messages for a New Radio Positioning Protocol A (NRPPa). The radio frequency band may include frequencies in a range of 600 MHz to 700 MHz or in a range of 2.5 GHz to 3.5 GHz.

An example of an apparatus according to the disclosure includes a memory, a transceiver, a processor communicatively coupled to the memory and the transceiver and configured to transmit a positioning reference signal (PRS) in a cell of the apparatus, the cell configured to operate with a first radio access technology (RAT), wherein the PRS is orthogonal to PRSs transmitted in a plurality of neighboring cells configured to operate with a second RAT, wherein the first RAT and the second RAT are different radio access technologies operating on the same radio frequency band, receive a request from a location server for configuration information for the PRS, and send the configuration information for the PRS to the location server, wherein the configuration information enables location measurements of the PRS by a mobile device, wherein the location measurements enable determination of a location of the mobile device.

An example apparatus according to the disclosure includes means for transmitting a positioning reference signal (PRS) in a cell of the apparatus, the cell configured to operate with a first radio access technology (RAT), wherein the PRS is orthogonal to PRSs transmitted in a plurality of neighboring cells configured to operate with a second RAT, wherein the first RAT and the second RAT are different radio access technologies operating on the same radio frequency band, means for receiving a request from a location server for configuration information for the PRS, and means for sending the configuration information for the PRS to the location server, wherein the configuration information enables location measurements of the PRS by a mobile device, wherein the location measurements enable determination of a location of the mobile device.

An example non-transitory processor-readable storage medium comprising processor-readable instructions configured to cause one or more processors to support positioning of a mobile device with dynamic spectrum sharing according to the disclosure includes code for transmitting a positioning reference signal (PRS) in a cell of a wireless node, the cell configured to operate with a first radio access technology (RAT), wherein the PRS is orthogonal to PRSs transmitted in a plurality of neighboring cells configured to operate with a second RAT, wherein the first RAT and the second RAT are different radio access technologies operating on the same radio frequency band, code for receiving a request from a location server for configuration information for the PRS, and code for sending the configuration information for the PRS to the location server, wherein the configuration information enables location measurements of the PRS by the mobile device, wherein the location measurements enable determination of a location of the mobile device.

Items and/or techniques described herein may provide one or more of the following capabilities, as well as other capabilities not mentioned. A dynamic spectrum sharing (DSS) scheme may allow for different radio access technologies to operate in the same frequency band. A mobile device may be configured to obtain location measurements for positioning reference signals transmitted by the different radio access technologies. A location server, or the mobile device, may be configured to determine a location of the mobile device based on the measurements obtained from the different radio access technologies. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Other and further objects, features, aspects, and advantages of the present disclosure will become better understood with the following detailed description of the accompanying drawings.

DETAILED DESCRIPTION

Figure 1:
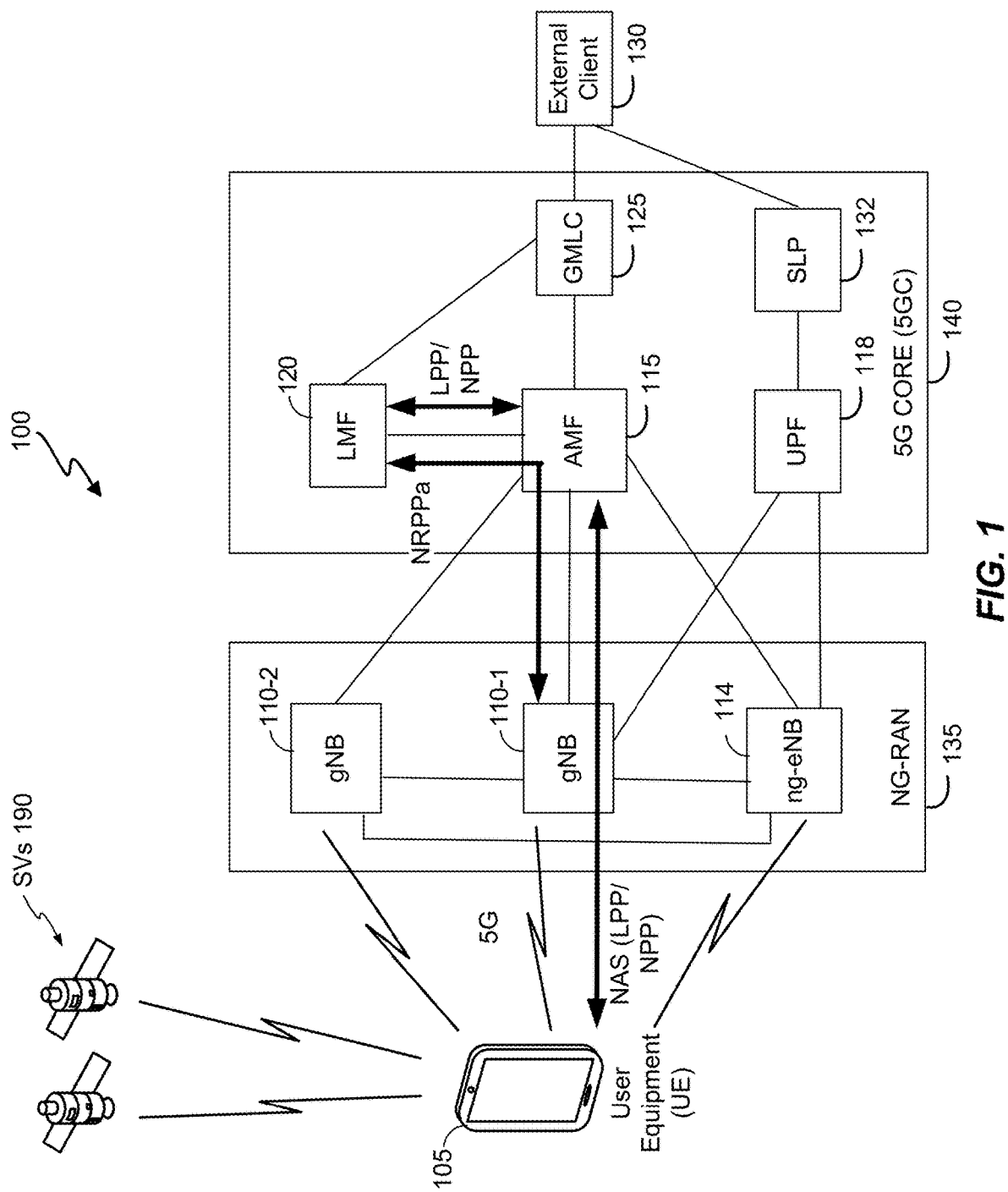
FIG. 1 is a simplified diagram of an example a 5G NR communication system.

Techniques are discussed herein for providing positioning reference signals (PRS) with dynamic spectrum sharing (DSS). In general, DSS allows the deployment of both 4G LTE and 5G NR in the same frequency band. DSS enables communication network operators to deploy 5G NR on an existing 4G LTE spectrum which will allow existing infrastructure to be used. A PRS is typically transmitted at fixed periodic intervals in one or more consecutive subframes, where a set of consecutive PRS subframes is referred to as a "positioning occasion", "PRS positioning occasion", "PRS transmission occasion" or "PRS occasion". Unlike downlink (DL) and uplink (UL) transmission for each UE, which can be dynamically scheduled to avoid interference or collision with other UL and DL transmissions, existing PRS positioning occasions cannot be dynamically scheduled or rescheduled to avoid interference or collision with other UL and DL transmission or other PRS transmissions. The techniques provided herein enable efficient positioning in a DSS environment. For example, since 4G LTE and 5G NR may operate within the same bandwidth (BW), both the 4G LTE PRS and the 5G NR PRS may be scheduled in the same set of positioning occasions. This may reduce the number of PRS resource elements (REs) required to provide the PRS, thus saving network resources and simplifying implementation. In one example, to avoid interference between the 5G NR PRS and the 4G LTE PRS in the shared positioning occasions, different coding for 4G LTE PRS and the 5G NR PRS may be used. A network operator may use orthogonal codes (also referred to as code sequences or PRS code sequences) for 4G LTE PRS and 5G NR PRS such that each PRS can be decoded individually in the same RE without mutual interference. This approach may be suitable when the subcarrier spacing of 5G NR where the PRS is scheduled is the same as for LTE (e.g. 15 KHz). The available PRS code sequences, for example, may be as defined in 3GPP TS 36.211 in the case of 4G LTE PRS and in 3GPP TS 38.211 in the case of 5G NR PRS.

In another example, a different muting pattern may be assigned such that at each PRS positioning occasion, only one of either a 4G LTE PRS or a 5G NR PRS is scheduled, but not both. The muting pattern may be used to ensure that the 4G LTE PRS and the 5G NR PRS will not interfere with one another. Muting in the time domain may be another method to ensure that positioning occasions for a 4G LTE PRS and a 5G NR PRS are orthogonal to one another. In this example, the UE's which are configured for 4G LTE only will measure the LTE PRS. UE's which are 5G NR capable may be configured to measure both the 5G NR PRS and the 4G LTE PRS, irrespective of which Radio Access Technology (RAT) they are presently camped on. Since the 5G NR PRS and the 4G LTE PRS will be transmitted on the same frequency, an LTE/NR capable UE will have an opportunity to increase the number of PRS measurements. This may also apply when such a UE is operating in 4G LTE mode but may still support 5G NR mode. The UE may have the capability to decode the subcarriers with different subcarrier spacing, and decode the 5G NR specific coding, etc. In this scenario, either a 4G LTE cell (e.g., for an eNodeB) or a 5G NR cell (e.g., for a gNB) may act as a reference cell. The 4G LTE and 5G NR assistance information may be provided by a network location server (LS). The LS may query a base station (e.g., eNodeB or gNB) utilizing existing protocols (e.g., LPPa or NRPPa) to determine if the described DSS solution is enabled at the base station.

Referring to FIG. 1, a simplified diagram of an example 5G NR communication system 100 is shown. The communication system 100 may be configured to implement PRS transmission and reception. The communication system 100 comprises a user equipment (UE) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network, or 5G NR; NG-RAN 135 may be referred to as a 5G RAN or as an NR RAN; and 5GC 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It is noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 include NR Node Bs, also referred to as gNBs, 110-1 and 110-2. Pairs of gNBs 110-1, 110-2 in NG-RAN 135 may be connected to one another—e.g. directly as shown in FIG. 1 or indirectly via other gNBs. Access to the 5G network is provided to UE 105 via wireless communication between the UE 105 and one or more of the gNBs 110-1, 110-2, which may provide wireless communications access to the 5GC on behalf of the UE 105 using 5G. In FIG. 1, the serving gNB for UE 105 is assumed to be gNB 110-1, although other gNBs (e.g. gNB 110-2) may act as a serving gNB if UE 105 moves to another location or may act as a secondary gNB to provide additional throughout and bandwidth to UE 105.

Base stations (BSs) in the NG-RAN 135 shown in FIG. 1 may also include a next generation evolved Node B, also referred to as an ng-eNB, 114. Ng-eNB 114 may be connected to one or more gNBs 110-1, 110-2 in NG-RAN 135—e.g. directly as shown in FIG. 1 or indirectly via other gNBs and/or other ng-eNBs. An ng-eNB 114 may provide LTE wireless access and/or evolved LTE (eLTE) wireless access to UE 105. Some gNBs 110-1, 110-2, and/or ng-eNB 114 in FIG. 1 may be configured to function as positioning-only beacons which may transmit signals (e.g. PRS) to assist positioning of UE 105 but may not receive signals from UE 105 or from other UEs.

The gNBs 110-1, 110-2 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), multi-cell RTT (also referred to as multi-RTT) and/or other position methods. The LMF 120 may also process location services requests for the UE 105, e.g., received from the AMF 115 or from the GMLC 125. The LMF 120 may be connected to AMF 115 and/or to GMLC 125. It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110-1, 110-2 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by 5GC 140 in some implementations.

As further illustrated in FIG. 1, the LMF 120 may communicate with the gNBs 110-1, 110-2 and/or ng-eNB 114 using a New Radio Position Protocol A (which may be referred to as NRPPa), which may be defined in 3GPP Technical Specification (TS) 38.455. With NRPPa, NRPPa messages may be transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355 and TS 37.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a service based protocol based on the HyperText Transfer Protocol (HTTP), and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA, multi-RTT and/or ECID. The NRPPa protocol may be used to support positioning of UE 105 using network based position methods such as ECID (e.g. when used with measurements obtained by a gNB 110-1, 110-2 or ng-eNB 114) and/or may be used by LMF 120 to obtain location related information from gNBs 110-1, 110-2 and/or ng-eNBs 114, such as parameters defining PRS transmission from gNBs 110-1, 110-2 and/or ng-eNB 114.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP), Receive Time-Transmission Time difference (Rx-Tx), and/or Reference Signal Received Quality (RSRQ) for gNBs 110-1, 110-2, ng-eNB 114 and/or a WLAN access point (AP). The location measurements may also or instead include measurements of GNSS pseudorange, code phase and/or carrier phase for SVs 190.

With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110-1, 110-2, ng-eNB 114 or other base stations or APs).

With a network based position method, one or more base stations (e.g. gNBs 110-1, 110-2 and/or ng-eNB 114) or APs may obtain location measurements (e.g. measurements of RSSI, RTT, RSRP, RSRQ, AOA, Rx-Tx or Time Of Arrival (TOA) for signals transmitted by UE 105) and/or may receive measurements obtained by UE 105, and may send the measurements to a location server (e.g. LMF 120) for computation of a location estimate for UE 105.

Information provided by the gNBs 110-1, 110-2 and/or ng-eNB 114 to the LMF 120 using NRPPa may include timing and configuration information for PRS transmission and location coordinates. The LMF 120 can then provide some or all of this information to the UE 105 as assistance data in an LPP and/or NPP message via the NG-RAN 135 and the 5GC 140.

5GC 140 may further include a User Plane Function (UPF) 118 supporting packet data access to and from UE 105. For example, UPF 118 may support Internet Protocol (IP) access to and from UE 105, may provide packet data access from UE 105 to other networks (not shown) such as the Internet, and may assign one or more IP addresses to UE 105. A Secure User Plane Location (SUPL) Location Platform (SLP) 132 in (or accessible from) 5GC 140 may act as a location server with capabilities similar to LMF 120, but supporting the SUPL user plane location solution defined by the Open Mobile Alliance (OMA). UE 105 and SLP 132 may support the SUPL solution by exchanging SUPL messages using the IP and Transmission Control Protocol (TCP) via UPF 118 and either gNB 110-1 or ng-eNB 114. An external client 130 may access location services (e.g. to request and receive a location for UE 105) by accessing either GMLC 125 or SLP 132.

An LPP or NPP message sent from the LMF 120 or SLP 132 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more measurements (e.g. RSTD measurements) of PRS signals and/or directional PRS signals transmitted within particular cells supported by particular gNBs 110-1, 110-2 and/or the ng-eNB 114 (or supported by some other type of base station such as an eNB or WiFi AP). The UE 105 may send the measurements back to the LMF 120 or SLP 132 in an LPP or NPP message (e.g. inside a 5G NAS message) via the serving gNB 110-1 (or serving ng-eNB 114) and the AMF 115.

While the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown in FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks.

Figure 2:
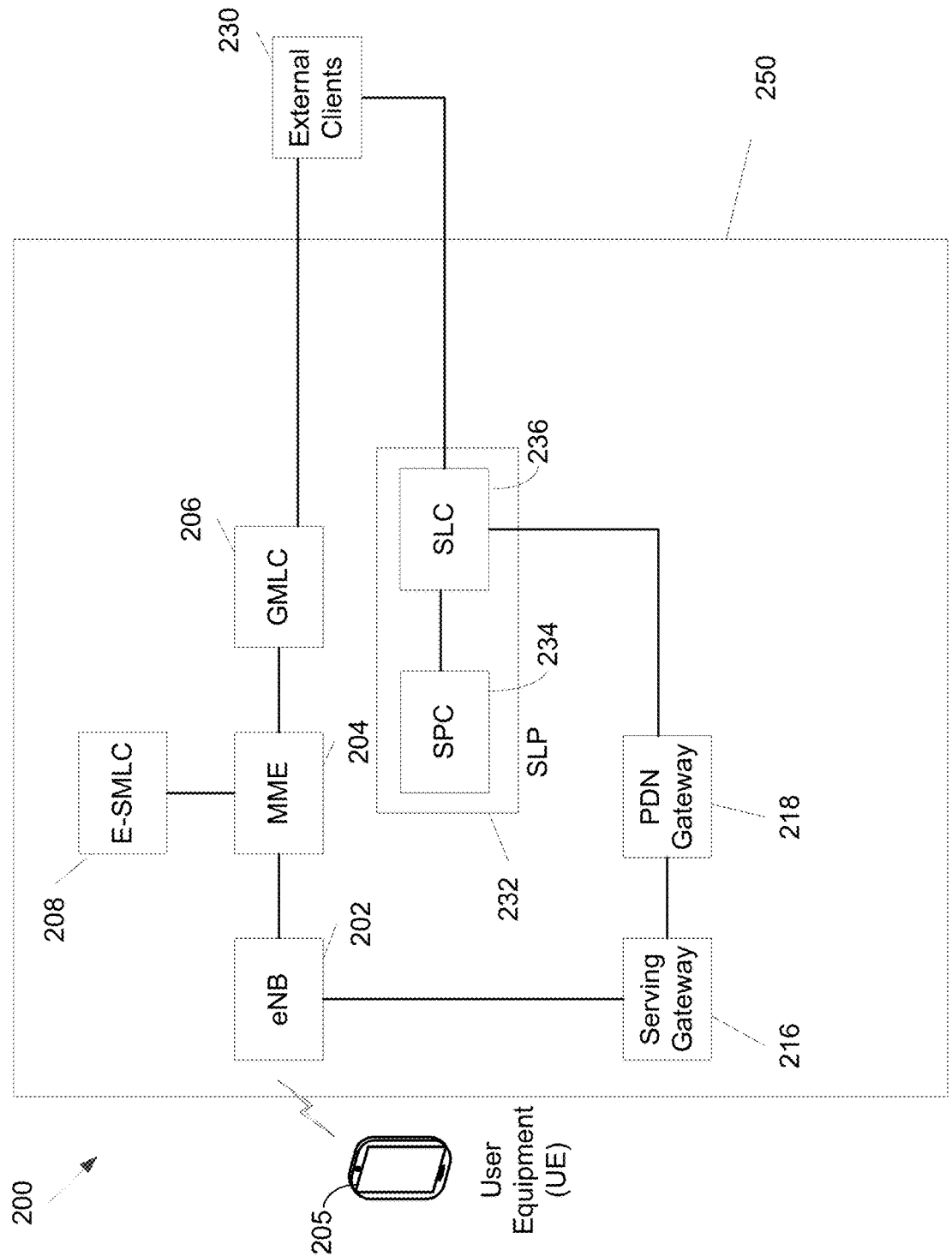
FIG. 2 is a simplified diagram of an example 4G LTE communication system.

Referring to FIG. 2, a simplified diagram of an example 4G LTE communication system 200 is shown. The system 200 includes a network 250 such as an Evolved Packet System (EPS) that supports LTE access (e.g. by the UE 105 or a UE 205) and possibly other access types (not shown in FIG. 2) such as CDMA2000, Wideband CDMA (WCDMA) and/or WiFi. The UE 205 may communicate with a serving evolved Node B (eNodeB or eNB) 202 in a radio access network (RAN) to obtain communication services from the network 250. The RAN may include other network entities not shown in FIG. 2 for simplicity and may also be referred to as an Evolved Universal Terrestrial Radio Access Network (E-UTRAN). The eNB 202 may also be referred to as a Node B, a base station, an access point, etc. The terms "access point" and "base station" are used interchangeably herein. The UE 205 may (i) receive signals from eNB 202 and from other base stations (e.g. other eNBs) and APs in network 250; (ii) obtain the identities of the source eNBs and other base stations and/or obtain the identities of the source cells from the received signals and/or (iii) obtain measurements of the received signals such as measurements of time of arrival (TOA), reference signal time difference (RSTD) for OTDOA positioning, pilot phase for AFLT positioning, and/or signal strength (e.g. received signal strength indication (RSSI)), signal quality (e.g. signal to noise ratio (S/N)), and/or round trip signal propagation time (RTT) for enhanced cell ID (ECID) positioning. The eNB identities, base station identities and/or cell identities and the different signal measurements may be used to derive a location estimate for UE 205 (e.g. by UE 205 or by a location server such as E-SMLC 208 or SLP 232).

The eNB 202 may communicate with a serving Mobility Management Entity (MME) 204 for UE 205, which may perform various control functions such as mobility management, Packet Data Network (PDN) gateway selection, authentication, bearer management, etc. MME 204 may communicate with an Enhanced Serving Mobile Location Center (E-SMLC) 208 and a Gateway Mobile Location Center (GMLC) 206. The E-SMLC 208 may support UE-based, UE-assisted, network-based and/or network-assisted positioning methods for UEs including UE 205 and may support one or more MMEs. E-SMLC 208 may support the 3GPP control plane location solution for LTE access as defined in 3GPP Technical Specifications (TSs) 23.271 and 36.305. The E-SMLC 208 may also be referred to as a location server (LS), a Stand Alone SMLC (SAS), etc. The GMLC 206 may perform various functions to support location services and provide services such as subscriber privacy, authorization, authentication, billing, etc. The network 250 may include additional functionally associated with location retrieval (LRF), Public Safety Answering Points (PSAPs), and others. This additional functionality is generally identified as external clients 230 in FIG. 2.

Network 250 may further include a PDN Gateway 218 and Serving Gateway 216 supporting packet data access to and from UE 205. For example, PDN Gateway 218 may support Internet Protocol (IP) access to and from UE 205, may provide packet data access from UE 205 to other networks (not shown) such as the Internet, and may assign one or more IP addresses to UE 205. An SLP 232 in network 250, which may be the same as or similar to SLP 132 in communication system 100, may act as a location server with capabilities similar to E-SMLC 208 but supporting the SUPL user plane location solution defined by OMA. UE 205 and SLP 232 may support the SUPL solution by exchanging SUPL messages using IP and TCP via PDN gateway 218, Serving Gateway 216 and eNB 202. An external client 230 may access location services by accessing either GMLC 206 or SLP 232.

In order to support positioning of a UE such as UE 205, E-SMLC 208 and SLP 232 may each use the LTE Positioning Protocol (LPP) defined in 3GPP TS 36.355 and TS 37.355 and/or the LPP Extensions (LPPe) protocol defined by OMA in which LPP and/or LPPe messages are exchanged between E-SMLC 208 or SLP 232 and the target UE (e.g. UE 205) that is being positioned. In the case of E-SMLC 208, LPP and/or LPPe messages exchanged with a target UE may be transferred as signaling via the serving MME and serving eNB for the target UE (e.g. eNB 202 and MME 204 if the target UE is UE 205). In the case of SLP 232, LPP and/or LPPe messages exchanged with a target UE may be transferred inside SUPL messages as data using IP transport via a PDN Gateway, Serving Gateway and serving eNB for the target UE (e.g. PDN Gateway 218, Serving Gateway 216 and eNB 202 if the target UE is UE 205). An LPP message that is combined with an LPPe message (e.g. with the LPPe message embedded inside the LPP message) may be referred to as LPP/LPPe message. Similarly, the combination of the LPP and LPPe protocols (e.g. as supported by exchanging LPP/LPPe messages between the UE 205 and E-SMLC 208 or SLP 232) may be referred to as an LPP/LPPe protocol. The LPP/LPPe protocol may be used to transfer PRS scheduling information, transmission, and measurement data as described herein.

In general, the functionality of the components of the 5G NR communication system 100 of FIG. 1 may be performed by equivalent components in the 4G LTE communication system 200 in FIG. 2. For example, the NG-RAN 135 may be replaced by the E-UTRAN containing one or more eNBs 202. The AMF 115 may be replaced by the MME 204, the E-SMLC 208 in place of the LMF 120 and the GMLC 206 that may be similar to the GMLC 125. The E-SMLC 208 may use LPPa in place of NRPPa to send and receive location information to and from the eNBs 202 in the E-UTRAN and may use LPP to support positioning of UE 105 and the UE 205 (i.e., the UE 105 may be configured to operate on both 5G and 4G networks). In these other embodiments, positioning of the UEs 105, 205 using PRS may be supported in an analogous manner to that described herein for a 5G network with the difference that functions and procedures described herein for gNBs 110-1, 110-2, ng-eNB 114, AMF 115, LMF 120 and SLP 132 may, in some cases, apply instead to other network elements such eNBs 202, WiFi APs, an MME 204, an E-SMLC 208 and an SLP 232.

As noted, in some embodiments, positioning functionality may be implemented, at least in part, using PRS transmissions and/or directional PRS transmissions, sent by base stations (e.g., gNBs 110-1, 110-2, ng-eNB 114, eNBs 202) that are within range of a UE whose position is to be determined (e.g., the UEs 105, 205). The UE may, in some instances, use the difference in the arrival times of downlink radio signals (e.g., PRS transmissions) from a plurality of base stations (e.g., gNBs 110-1, 110-2, ng-eNB 114, eNBs 202) to compute the UE's position. For example, if a signal from one base station is received at a time $t_1$, and a signal from another base station is received at a time $t_2$, then the OTDOA or RSTD may be computed according to $t_2$-$t_1$.

Figure 3:
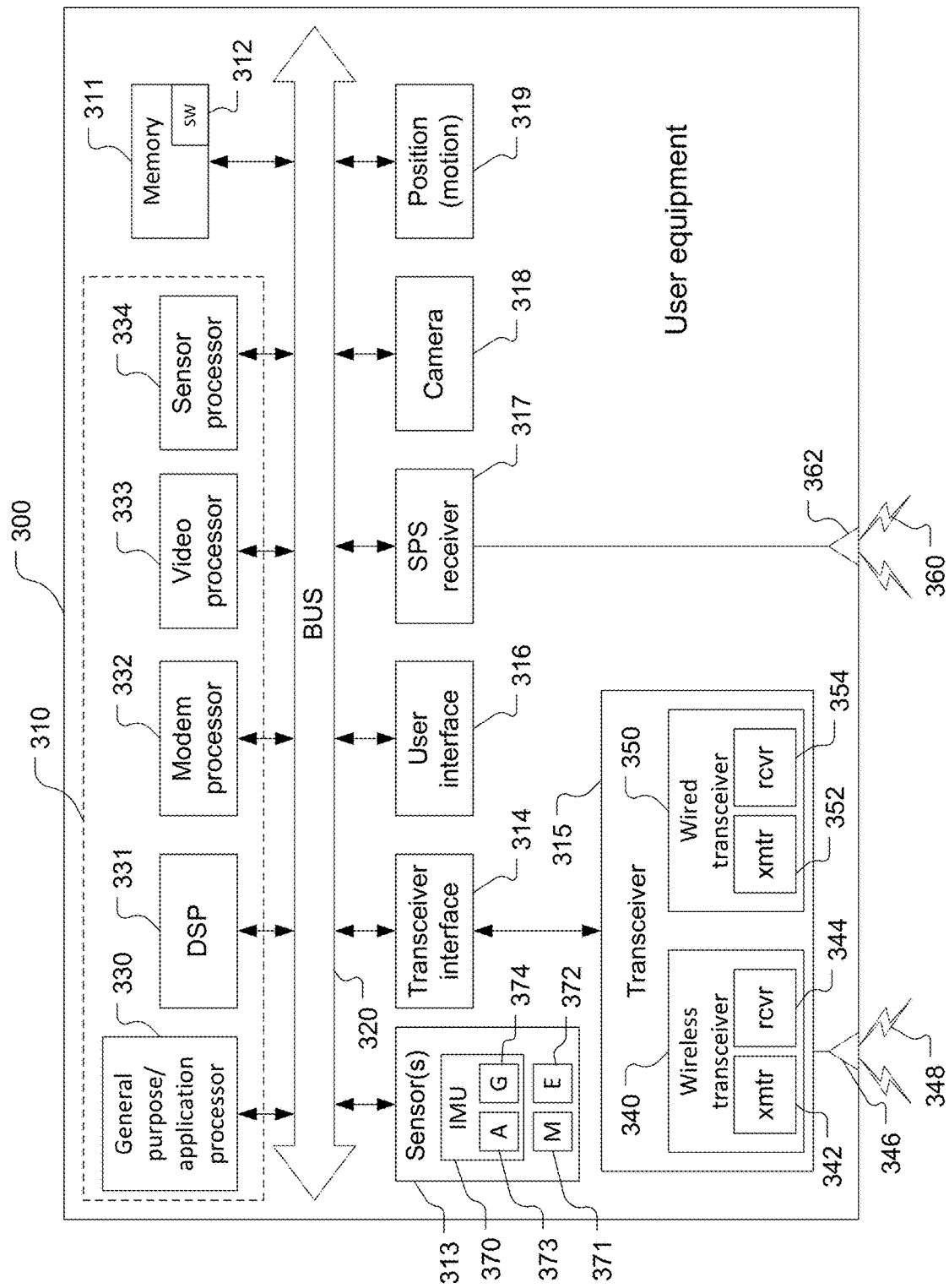
FIG. 3 is a block diagram of components of an example user equipment capable of communicating with either one or both of the communication systems in FIGS. 1 and 2.

Referring also to FIG. 3, a UE 300 is an example of the UEs 105, 205 and comprises a computing platform including a processor 310, memory 311 including software (SW) 312, one or more sensors 313, a transceiver interface 314 for a transceiver 315, a user interface 316, a Satellite Positioning System (SPS) receiver 317, a camera 318, and a position (motion) device 319. The processor 310, the memory 311, the sensor(s) 313, the transceiver interface 314, the user interface 316, the SPS receiver 317, the camera 318, and the position (motion) device 319 may be communicatively coupled to each other by a bus 320 (which may be configured, e.g., for optical and/or electrical communication). One or more of the shown apparatus (e.g., the camera 318, the position (motion) device 319, and/or one or more of the sensor(s) 313, etc.) may be omitted from the UE 300. The processor 310 may include one or more intelligent hardware devices, e.g., a central processing unit (CPU), a microcontroller, an application specific integrated circuit (ASIC), etc.

The processor 310 may comprise multiple processors including a general-purpose/application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The modem processor 332 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 300 for connectivity. The memory 311 is a non-transitory storage medium that may include random access memory (RAM), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors 330-334 performing the function. The description may refer to the UE 300 performing a function as shorthand for one or more appropriate components of the UE 300 performing the function. The processor 310 may include a memory with stored instructions in addition to and/or instead of the memory 311. Functionality of the processor 310 is discussed more fully below.

The configuration of the UE 300 shown in FIG. 3 is an example and not limiting of the invention, including the claims, and other configurations may be used. For example, an example configuration of the UE includes one or more of the processors 330-334 of the processor 310, the memory 311, and the wireless transceiver 340. Other example configurations include one or more of the processors 330-334 of the processor 310, the memory 311, the wireless transceiver 340, and one or more of the sensor(s) 313, the user interface 316, the SPS receiver 317, the camera 318, the PMD 319, and/or the wired transceiver 350.

The UE 300 may comprise the modem processor 332 that may be capable of performing baseband processing of signals received and down-converted by the transceiver 315 and/or the SPS receiver 317. The modem processor 332 may perform baseband processing of signals to be upconverted for transmission by the transceiver 315. Also or alternatively, baseband processing may be performed by the processor 330 and/or the DSP 331. Other configurations, however, may be used to perform baseband processing.

The UE 300 may include the sensor(s) 313 that may include, for example, an Inertial Measurement Unit (IMU) 370, one or more magnetometers 371, and/or one or more environment sensors 372. The IMU 370 may comprise one or more inertial sensors, for example, one or more accelerometers 373 (e.g., collectively responding to acceleration of the UE 300 in three dimensions) and/or one or more gyroscopes 374. The magnetometer(s) may provide measurements to determine orientation (e.g., relative to magnetic north and/or true north) that may be used for any of a variety of purposes, e.g., to support one or more compass applications. The environment sensor(s) 372 may comprise, for example, one or more temperature sensors, one or more barometric pressure sensors, one or more ambient light sensors, one or more camera imagers, and/or one or more microphones, etc. The sensor(s) 313 may generate analog and/or digital signals indications of which may be stored in the memory 311 and processed by the DSP 331 and/or the processor 330 in support of one or more applications such as, for example, applications directed to positioning and/or navigation operations.

The sensor(s) 313 may be used in relative location measurements, relative location determination, motion determination, etc. Information detected by the sensor(s) 313 may be used for motion detection, relative displacement, dead reckoning, sensor-based location determination, and/or sensor-assisted location determination. The sensor(s) 313 may be useful to determine whether the UE 300 is fixed (stationary) or mobile and/or whether to report certain useful information to the server (i.e., LMF 120, SLP 132 or E-SMLC 208) regarding the mobility of the UE 300. For example, based on the information obtained/measured by the sensor(s) 313, the UE 300 may notify/report to the server (i.e., LMF 120, SLP 132 or E-SMLC 208) that the UE 300 has detected movements or that the UE 300 has moved, and report the relative displacement/distance (e.g., via dead reckoning, or sensor-based location determination, or sensor-assisted location determination enabled by the sensor(s) 313). In another example, for relative positioning information, the sensors/IMU can be used to determine the angle and/or orientation of the other device with respect to the UE 300, etc.

The IMU 370 may be configured to provide measurements about a direction of motion and/or a speed of motion of the UE 300, which may be used in relative location determination. For example, the one or more accelerometers 373 and/or the one or more gyroscopes 374 of the IMU 370 may detect, respectively, a linear acceleration and a speed of rotation of the UE 300. The linear acceleration and speed of rotation measurements of the UE 300 may be integrated over time to determine an instantaneous direction of motion as well as a displacement of the UE 300. The instantaneous direction of motion and the displacement may be integrated to track a location of the UE 300. For example, a reference location of the UE 300 may be determined, e.g., using the SPS receiver 317 (and/or by some other means) for a moment in time and measurements from the accelerometer(s) 373 and gyroscope(s) 374 taken after this moment in time may be used in dead reckoning to determine present location of the UE 300 based on movement (direction and distance) of the UE 300 relative to the reference location.

The magnetometer(s) 371 may determine magnetic field strengths in different directions which may be used to determine orientation of the UE 300. For example, the orientation may be used to provide a digital compass for the UE 300. The magnetometer(s) 371 may include a two-dimensional magnetometer configured to detect and provide indications of magnetic field strength in two orthogonal dimensions. Also or alternatively, the magnetometer(s) 371 may include a three-dimensional magnetometer configured to detect and provide indications of magnetic field strength in three orthogonal dimensions. The magnetometer(s) 371 may provide means for sensing a magnetic field and providing indications of the magnetic field, e.g., to the processor 310.

The transceiver 315 may include a wireless transceiver 340 and a wired transceiver 350 configured to communicate with other devices through wireless connections and wired connections, respectively. For example, the wireless transceiver b may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. A PRS reference signal transmission schedule and associated measurements may be obtained via the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 350 may include a transmitter 352 and a receiver 354 configured for wired communication, e.g., with the network 135 to send communications to, and receive communications from, the gNB 110-1, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315.

The user interface 316 may comprise one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the UE 300. For example, the user interface 316 may store indications of analog and/or digital signals in the memory 311 to be processed by DSP 331 and/or the general-purpose processor 330 in response to action from a user. Similarly, applications hosted on the UE 300 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 316 may comprise one or more touch sensors responsive to touching and/or pressure, e.g., on a keyboard and/or touch screen of the user interface 316.

The SPS receiver 317 (e.g., a Global Positioning System (GPS) receiver) may be capable of receiving and acquiring SPS signals 360 via an SPS antenna 362. The antenna 362 is configured to transduce the wireless signals 360 to wired signals, e.g., electrical or optical signals, and may be integrated with the antenna 346. The SPS receiver 317 may be configured to process, in whole or in part, the acquired SPS signals 360 for estimating a location of the UE 300. For example, the SPS receiver 317 may be configured to determine location of the UE 300 by trilateration using the SPS signals 360. The general-purpose processor 330, the memory 311, the DSP 331 and/or one or more specialized processors (not shown) may be utilized to process acquired SPS signals, in whole or in part, and/or to calculate an estimated location of the UE 300, in conjunction with the SPS receiver 317. The memory 311 may store indications (e.g., measurements) of the SPS signals 360 and/or other signals (e.g., signals acquired from the wireless transceiver 340) for use in performing positioning operations. The general-purpose processor 330, the DSP 331, and/or one or more specialized processors, and/or the memory 311 may provide or support a location engine for use in processing measurements to estimate a location of the UE 300.

The UE 300 may include the camera 318 for capturing still or moving imagery. The camera 318 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown), e.g., of the user interface 316.

The position (motion) device (PMD) 319 may be configured to determine a position and possibly motion of the UE 300. For example, the PMD 319 may communicate with, and/or include some or all of, the SPS receiver 317. The PMD 319 may also or alternatively be configured to determine location of the UE 300 using terrestrial-based signals such as 4G LTE and 5G NR PRS transmission schedule (e.g., at least some of the signals 348) for trilateration, for assistance with obtaining and using the SPS signals 360, or both. The PMD 319 may be configured to use one or more other techniques (e.g., relying on the UE's self-reported location (e.g., part of the UE's position beacon)) for determining the location of the UE 300, and may use a combination of techniques (e.g., SPS and terrestrial positioning signals) to determine the location of the UE 300. The PMD 319 may include one or more of the sensors 313 (e.g., gyroscope(s), accelerometer(s), magnetometer(s), etc.) that may sense orientation and/or motion of the UE 300 and provide indications thereof that the processor 310 (e.g., the processor 330 and/or the DSP 331) may be configured to use to determine motion (e.g., a velocity vector and/or an acceleration vector) of the UE 300. The PMD 319 may be configured to provide indications of uncertainty and/or error in the determined position and/or motion.

Figure 4:
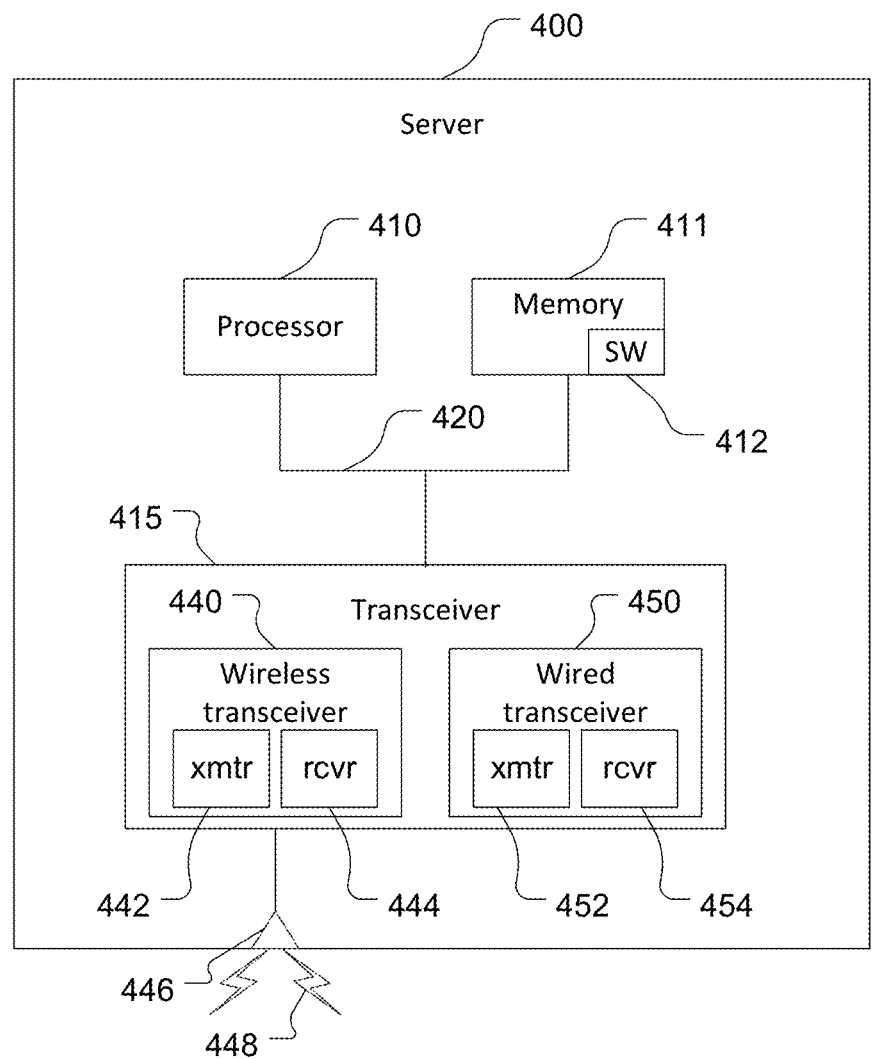
FIG. 4 is a block diagram of components of an example server shown in FIGS. 1 and 2.

Referring to FIG. 4, with further reference to FIGS. 1-3, a block diagram of components of an example server 400 is shown. The server 400 is an example of a location server such as the LMF 120, the SLP 132, the E-SMLC 208, or the SLP 232. The server 400 may also be an example of base station such as the gNB 110-1, the ng-eNB 114, and the eNB 202. A server 400 may also include, or be connected to, one or more SPS receivers (not pictured in FIG. 4). The server 400 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 3). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 300, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the gNB 110-1 the ng-eNB 114, and the eNB 202, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the gNB 110-1, the ng-eNB 114, the eNB 202 and/or the UE 300.

Figure 5:
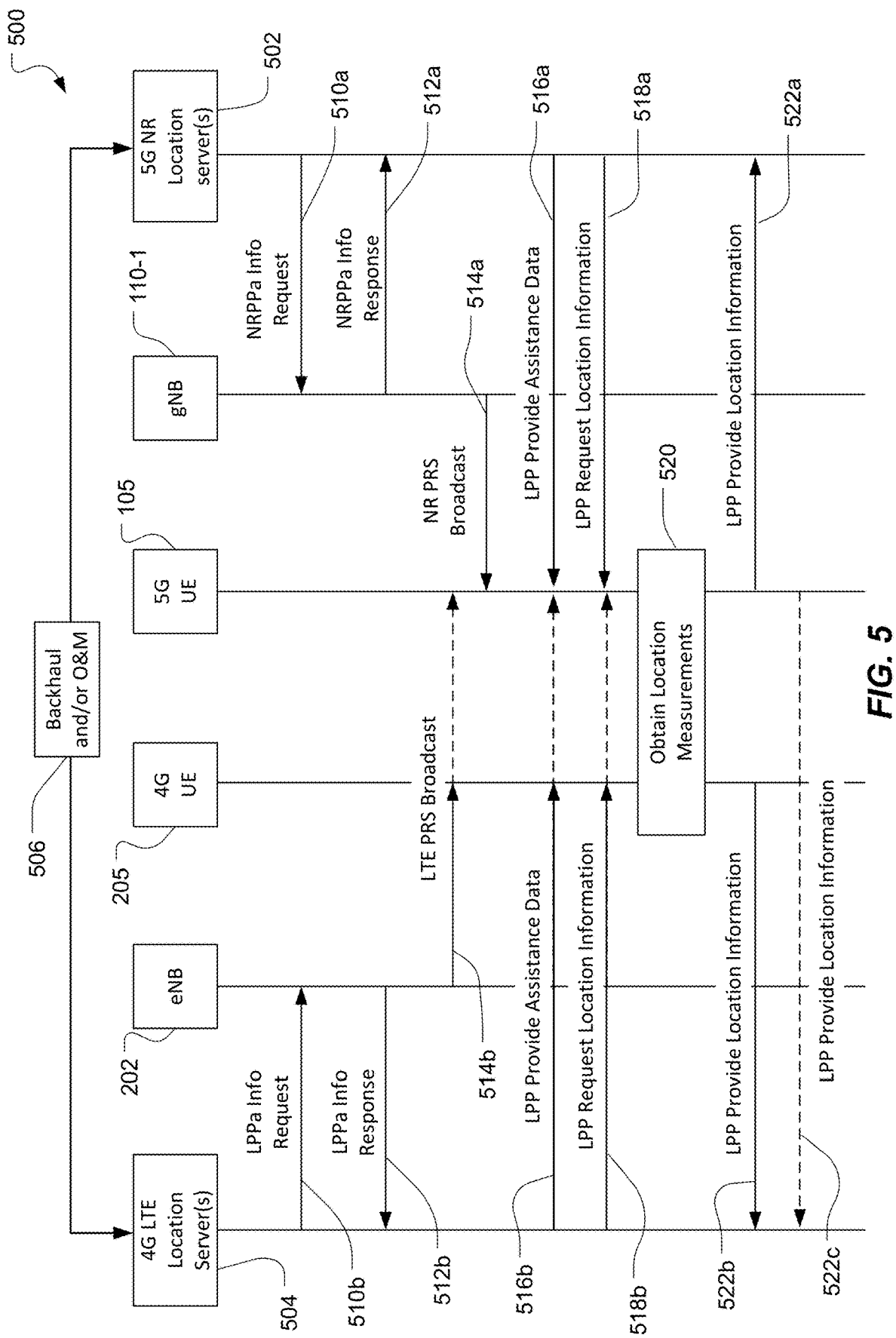
FIG. 5 is an example signaling flow diagram showing messages sent between components of communication networks during a location session.

Referring to FIG. 5, with further reference to FIGS. 1-4, an example signal flow diagram 500 showing messages sent between components of communication networks during a location session is shown. The communication networks include the 5G NR communication system 100 and the 4G LTE communication system 200. The flow diagram 500 includes 5G NR location server(s) 502 (e.g., the LMF 120 or SLP 132), and 4G LTE location server(s) 504 (e.g., the E-SMLC 208 or SLP 232). The location servers 502, 504 may be connected to a common backhaul architecture and/or Operations and Maintenance (O&M) server 506. With a common backhaul architecture 506, location servers 502, 504 may communicate with one another in order to send and receive information regarding DL PRS transmission from eNB(s) 202, ng-eNB(s) 114 and/or gNB(s) 110. With an O&M server 506, location servers 502, 504 may each be provided with information regarding DL PRS transmission from eNB(s) 202, ng-eNB(s) 114 and/or gNB(s) 110 by the O&M server 506. A location session may utilize LPP and/or LPPe between the UEs 105, 205 and a respective location server 502, 504.

While the signaling flow 500 is discussed, for ease of illustration, in relation to a 4G LTE and 5G NR communication networks, similar messaging may be realized for other communication technologies or protocols (such as WLAN). Furthermore, in some embodiments, the UEs 105, 205 may be configured to determine their respective locations using, for example, assistance data provided to it (e.g. by a serving gNB 110-1 and/or a serving eNB 202). The positioning protocol used for signaling flow 500 may be LPP, LPPe or LPP combined with LPPe (e.g. where an LPP message includes an embedded LPPe message). Although messages for the positioning protocol are referred to below as LPP messages, it is to be understood that the messages may be LPP/LPPe messages.

It is noted that the signaling flow 500 describes location for two separate UEs 105 and 205, where NR and LTE are being supported using DSS. The combined description below shows how both UEs may be located according to embodiments when DSS is used. However, it is not intended that the location of each of the UEs 105 and 205 necessarily occurs at the same time or is in any way dependent on or related to the location of the other UE.

In some embodiments, a location session for a UE 105, 205 can be triggered when the respective location server 502, 504 receives a location request for a UE 105, 205. The location servers 502, 504 and the UEs 105, 205 may exchange LPP request/provide capabilities messages (not shown in FIG. 5). The LPP request/provide capabilities messages may indicate that the UE 105, 205 is configured to measure PRS signals with dynamic spectrum sharing (DSS). For example, the capabilities may indicate that the UEs 105, 205 are able to tune PRS reception using multiple antennas. In an example, the 5G UE 105 may indicate that it is capable of receiving directional PRS from a gNB. Based on the positioning capabilities of the respective UEs 105, 205, the location servers 502, 504 may select one or more position methods to locate the UEs 105, 205. For example, the location servers 502, 504 may select OTDOA, multi-RTD, AOD and/or ECID in association with PRSs transmitted from gNBs 110 and eNB 202.

Based on the position method(s) selected and/or on assistance data indicated by the UEs 105, 205 as being supported in the LPP request/provide capabilities messages that may be exchanged, the location servers 502, 504 may determine assistance data for the UEs 105, 205 to support the selected position method(s). The 5G NR location server 502 may then send an NRPPa Information Request message to the serving gNB 110-1 at action 510a, and the 4G LTE location server 504 may send a LPPa Information Request message to the serving eNB 202 at action 510b. While the messages in the message flow diagram 500 appear to occur simultaneously, in operation they may occur at different times. The NRPPa and LPPa Information Requests may request respective location related information for gNB 110-1 and the eNB 202. For example, the location related information may include the respective locations of the gNB 110-1 and eNB 202, the PRS configuration parameters for the gNB 110-1 and the eNB 202, and/or information concerning broadcast of assistance data by the gNB 110-1 and the eNB 202.

The NRPPa and LPPa Information Requests at actions 510a-b may include a request for configuration parameters related to PRSs (e.g., signal characteristics for each PRS transmitted by the gNB 110-1 and eNB 202). The serving gNB 110-1 responds with an NRPPa Information Response message at action 512a, and the serving node eNB 202 responds with a LPPa Information Response message at action 512b. The NRPPa and LPPa Information Responses may provide some or all of the location related information requested at respective actions 510a-b. For example, when configuration parameters for PRSs are requested at actions 510a-b, the NRPPa and LPPa Information Responses may provide a configuration including signal characteristics and other configuration information for each PRS supported by the respective gNB 110-1 and eNB 202. For example, the signal characteristics may include PRS scheduling information. The configuration information may include orthogonal characteristics, where the orthogonal characteristics for each PRS reduce interference between this PRS and other PRSs supported by gNB 110-1, eNB 202 and other gNBs 110 and other eNBs. For example, the orthogonal characteristics may include at least one of a distinct frequency shift, an orthogonal PRS code sequence, a distinct frequency hopping sequence, a distinct muting pattern, or some combination of these, as described later in more detail with respect to FIGS. 9A and 9B.

Actions 510a-b and 512a-b may be repeated by the location servers 502, 504 to obtain location related information (e.g. configuration parameters for PRSs) from other gNBs 110, ng-eNBs 114, and eNBs nearby to the UEs 105, 205.

In some implementations, serving gNB 110-1 and eNB 202 (and/or other gNBs 110, ng-eNBs 114, and eNBs, not shown in FIG. 5) may broadcast assistance data to the UEs 105, 205 (and to other UEs) at respective actions 514a and 514b, and/or may provide assistance data to UEs 105, 205 by point to point means, e.g. using a Radio Resource Control Protocol (RRC) for 5G access (not shown in FIG. 5). The broadcast may use System Information Blocks (SIBs) for an RRC protocol in some implementations. The assistance data may include configuration parameters and signal characteristics for PRS signals that are transmitted by the sending gNB 110 and the eNB 202 (and/or that are transmitted by other neighboring gNBs 110, ng-eNB 114 and eNBs). The configuration parameters and signal characteristics for PRS signals broadcast by the gNB 110-1 and the eNB 202 may be some or all of the configuration parameters and signal characteristics for PRS signals described further down for the location related information sent at actions 516a-b. The configuration parameters may include orthogonal characteristics as described above for actions 512a-b. In some embodiments, actions 516a and 516b, as described next, may not occur—e.g. if all location related information can be broadcast to the UEs 105, 205 by the gNB 110-1 and/or by the eNB 202. In an example, the 5G UE 105 may be configured to operate on both the 4G LTE and 5G NR networks and may be configured to receive the eNB 202 PRS signal characteristics via the broadcast 514b from the eNB 202.

The location servers 502, 504 may send some or all of the assistance data received at respective actions 512a-b, and possibly other assistance data already known to the location servers 502, 504, to the UEs 105, 205 via respective LPP Provide Assistance Data message 516a sent to the UE 105 by the 5G NR location server 502, and the LPP Provide Assistance Data message 516b sent to the UE 205 by the 4G LTE location server 504. In the case of positioning for OTDOA, AOD and multi-RTT, the assistance data can include the identities of a reference cell and neighbor cells supported by gNB 110-1, eNB 202 and other gNBs 110, ng-eNBs 114 and eNBs and may include information for each cell, such as the cell carrier frequency, and configuration parameters (e.g. including orthogonal characteristics) for each PRS transmitted within the cell. For example, in such embodiments, the assistance data may include, for each PRS transmitted by the reference cell or a neighbor cell, such information as a PRS ID, a transmission point ID, a physical cell ID, a code sequence, a muting pattern, a frequency shift (vshift), a frequency hopping sequence, a periodicity and duration of positioning occasions etc.

The LPP Provide Assistance Data messages transmitted at the actions 516a-b maybe be followed by LPP Request Location Information messages transmitted at actions 518a-b. The LPP Request Location Information messages may request one or more location measurements from the UEs 105, 205 and/or a location estimate. The positioning measurements may, for example, be downlink (DL) measurements of PRS transmitted from nearby cells and may be identified and defined in the assistance data received at actions 516a-b and/or actions 514a-b. The positioning measurements may include TOA measurements for OTDOA or ECID, RSTD measurements for OTDOA, Rx-Tx measurements for multi-RTT, RSRP measurements for AOD or ECID, RSRQ, etc. For advanced networks with beamforming technology, measurements may also include an AOA. Some of the positioning measurements may further be specified or allowed to be measured for directional PRSs— e.g. directional PRSs for which configuration parameters and signal characteristics may have been provided, as previously described for actions 514a, 516a.

At action 520, the UEs 105, 205 can respectively obtain some or all of the location measurements (and other information) requested at actions 518a-b. For ease of explanation, action 520 is depicted as a single action but in operation each UE 105, 205 is configured to obtain measurements independently and at different times. The location measurements may be made based, in part, on the PRSs transmitted by the serving gNB 110-1, the eNB 202 and/or by other neighboring gNBs 110, ng-eNB 114, and other eNBs. For example, for OTDOA, multi-RTT and AOD, the PRSs may be transmitted by the gNB 110-1, the eNB 202 within the reference cell and/or neighbor cells. The measurements obtained at action 520 may comprise some or all of the measurements requested at actions 518a-b or implied at actions 518a-b (e.g. if actions 518a-b request location estimates from the UEs 105, 205 or reference location measurements implied or identified at actions 516a-b). UE 105 may measure PRSs from the gNB 110-1 and the eNB 202 as well as 4G LTE and 5G NR cells for other neighboring gNBs 110, ng-eNBs 114 and/or other eNBs (e.g., the UE 105 may be compatible with both 4G and 5G RATs). The UE 205 may be limited to measuring PRSs from the eNB 202 and other eNBs or ng-eNBs 114 in neighboring 4G LTE cells (e.g., the UE 205 is limited to 4G LTE RAT). For example, UEs 105, 205 may use one or more of a PRS ID, a transmission point ID, a physical cell ID, a code sequence, a muting pattern, a frequency shift (vshift), a frequency hopping sequence, a periodicity and duration of positioning occasions for a PRS to acquire the PRS and measure characteristics such as a TOA, Rx-Tx, RSTD, RSSI, RSRP, RSRQ, etc.

In some embodiments, at least some of the location measurements obtained at action 520 are provided in respective LPP Provide Location Information messages, which are sent from the UEs 105, 205 to the location servers 502, 504 at actions 522a-b. With this information, the location servers 502, 504 may be configured to determine the respective locations of the UE 105 and/or the UE 205. In some embodiments, the UEs 105, 205 may be configured to determine their respective locations locally based on the measurements obtained at action 520.

In one embodiment, 5G capable UE 105 may have a location session with 4G location server 504 instead of with 5G location server 502. This may occur if UE 105 has LTE access to eNB 202 rather than NR access to gNB 110-1 or LTE access to ng-eNB 114. In this embodiment, UE 105 may exchange LPP request/provide capabilities messages with location server 504 indicating that UE 105 can receive assistance data and obtain measurements for PRS transmitted by both eNBs (e.g. eNB 202) and gNBs 110 and ng-eNBs 114. Actions 516a, 518a and 522a in FIG. 5 may then be replaced by actions 516b, 518b and 522c, respectively, in which the LPP messages described above for these actions are received by UE 105 from, or sent by UE 105 to, location server 504, as indicated by the dashed arrows and dashed arrow extensions for these actions shown in FIG. 5.

In some embodiments, location servers 502 and 504 may be combined such that a single location server can act as location server 502 and location server 504. Such a combined location server can perform actions 510a-b and 512a-b in order to request and obtain PRS configuration information, including PRS orthogonal characteristics, from gNB 110-1, eNB 202, others gNBs 110 and other eNBs. The combined location server can then request location measurements from 5G UE 105 of PRS transmitted from gNBs 110 and eNBs as described above (e.g. for actions 516a-b and 518a-b) and may act as location server 502 when 5G UE 105 has 5G NR access to gNB 110-1 or as location server 504 when 5G UE 105 has LTE access to eNB 202.

Figure 6:
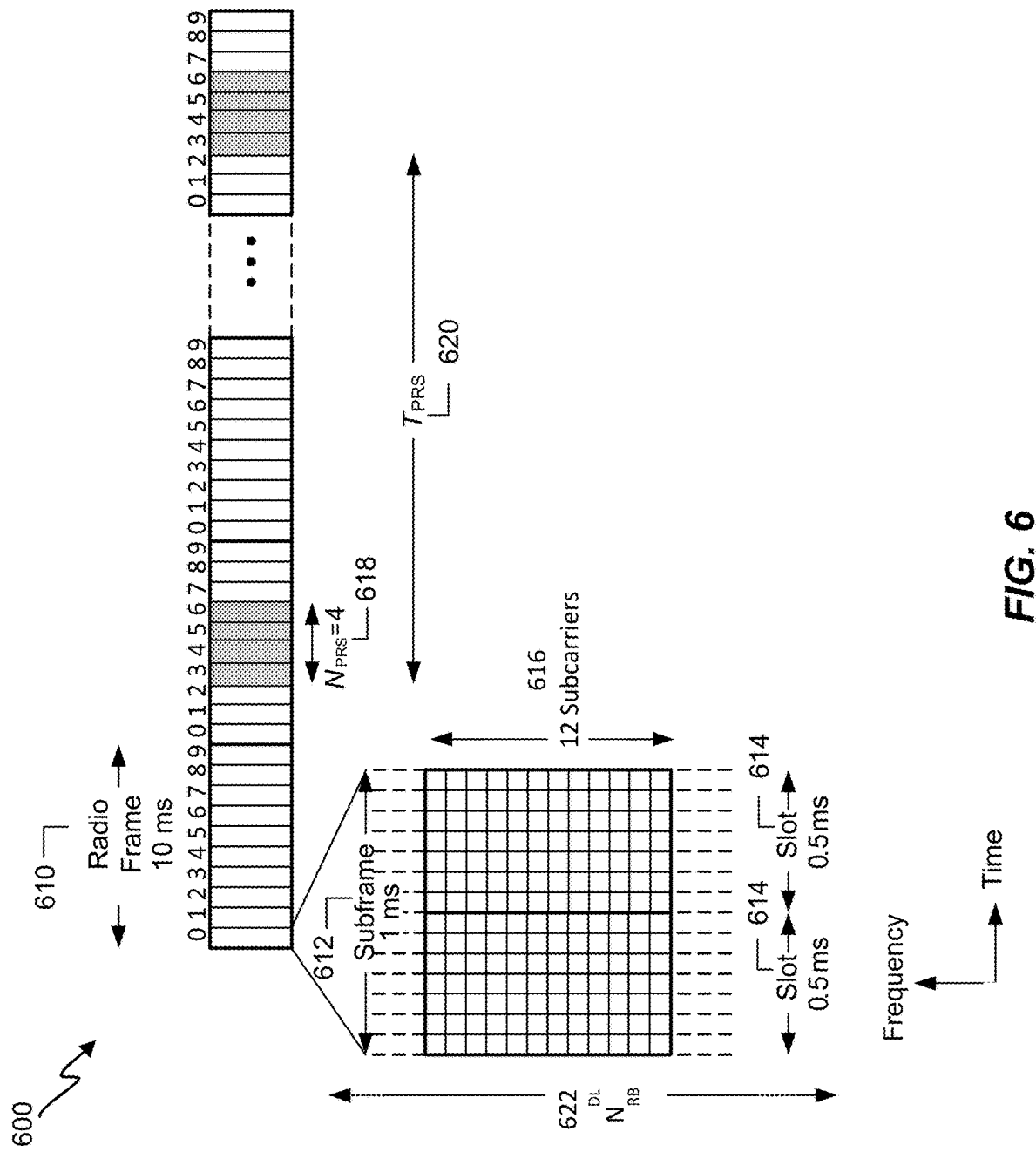
FIG. 6 is a diagram of a structure of an example LTE subframe sequence with PRS positioning occasions.

Referring to FIG. 6, an example LTE subframe sequence 600 with PRS positioning occasions is shown. Subframe sequence 600 may be applicable to broadcast of PRS eNB 202, gNB 110-1 and ng-eNB 114 in the communication systems 100, 200. While FIG. 6 provides an example of a subframe sequence for a 4G LTE network, similar subframe sequence implementations may be realized for other communication technologies/protocols, such as 5G NR. For example, the gNB 110-1 in communication system 100 may broadcast a PRS, a directional PRS or other type of reference signal (RS) or directional RS (e.g. a Tracking Reference Signal (TRS)) that is similar to subframe sequence 600. In FIG. 6, time is represented horizontally (e.g., on an X axis) with time increasing from left to right, while frequency is represented vertically (e.g., on a Y axis) with frequency increasing (or decreasing) from bottom to top. As shown in FIG. 6, downlink and uplink LTE Radio Frames 610 may be of 10 milliseconds (ms) duration each. For downlink Frequency Division Duplex (FDD) mode, Radio Frames 610 are organized, in the illustrated embodiments, into ten subframes 612 of 1 ms duration each. Each subframe 612 comprises two slots 614, each of, for example, 0.5 ms duration.

In the frequency domain, the available bandwidth may be divided into uniformly spaced orthogonal subcarriers 616. For example, for a normal length cyclic prefix using, for example, 15 kHz spacing, subcarriers 616 may be grouped into a group of twelve (12) subcarriers. Each grouping, which comprises the 12 subcarriers 616, is termed a resource block, and in the example above, the number of subcarriers in the resource block may be written as $N_{SC}^{RB}=12$. For a given channel bandwidth, the number of available resource blocks on each channel 622, which is also called the transmission bandwidth configuration 622, is indicated as $N_{RB}^{DL}$. For example, for a 3 MHz channel bandwidth in the above example, the number of available resource blocks on each channel 622 is given by $N_{RB}^{DL}=15$.

In the communication systems 100, 200 illustrated in FIGS. 1 and 2, an ng-eNB 114 or a gNB 110-1, 110-2, eNB 202, may transmit frames, or other physical layer signaling sequences, supporting PRS signals (i.e. a downlink (DL) PRS) according to frame configurations either similar to, or the same as that, shown in FIG. 6 and (as described later) in FIG. 7, which may be measured and used for UE position determination. As noted, other types of wireless nodes and base stations (e.g. WiFi AP) may also be configured to transmit PRS signals configured in a manner similar to (or the same as) that depicted in FIGS. 6 and 7. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes after appropriate configuration (e.g., by an Operations and Maintenance (O&M) server). A PRS may be transmitted in special positioning subframes that are grouped into positioning occasions. For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 6 illustrates a periodicity of positioning occasions where $N_{PRS}$ equals 4 618 and $T_{PRS}$ is greater than or equal to 20 620. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and TOA and RSTD measurement, by UEs, of PRS signals that are not muted (by avoiding interference from PRS signals that have been muted). Muting may be viewed as the non-transmission of a PRS for a given positioning occasion for a particular cell. Muting may be utilized in DSS to ensure positioning occasions for different RATs do not interfere with one another. Muting patterns (also referred to as muting sequences) may be signaled (e.g. using LPP) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS ID for a cell or TP (denoted as $N_{ID}^{PRS}$) or as a function of a Physical Cell Identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration may comprise a distinct frequency offset (vshift), a distinct carrier frequency, a distinct bandwidth, a distinct (e.g. orthogonal) code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional (e.g. beam formed) PRS and may then have additional distinct characteristics such as a distinct direction of transmission, a distinct range of horizontal angles and/or a distinct range of vertical angles. Further enhancements of a PRS may also be supported by a wireless node.

As discussed herein (e.g. for actions 512a-b, and 516a-b of signaling flow 500), in some embodiments, assistance data for OTDOA, AOD, multi-RTT or other position methods may be provided to a UE 105, 205 by a location server 502, 504 for a "reference cell" and/or one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, and/or other cell related parameters applicable to OTDOA, AOD, multi-RTT or some other position method (e.g. ECID).

PRS-based positioning by a UE 105, 205 may be facilitated by indicating the serving cell for the UE 105, 205 in the assistance data (e.g. with the reference cell indicated as being the serving cell). In the case of the UE 105 with 5G wireless access, the reference cell may be chosen by the LMF 120 or SLP 132 as some cell (e.g. supported by a gNB 110-1) with good coverage at the expected approximate location of the UE 105 (e.g., as indicated by the known 5G serving cell for the UE 105).

In some embodiments, assistance data may also include "expected RSTD" parameters, which provide the UE 105, 205 with information about the RSTD values a UE 105, 205 is expected to measure at its current location between the reference cell and each neighbor cell, together with an uncertainty of the expected RSTD parameter. The expected RSTD, together with the associated uncertainty, may define a search window for a UE 105, 205 within which the UEs 105, 205 are expected to measure the RSTD value. Assistance information may also include PRS configuration information parameters, which allow the UEs 105, 205 to determine when a PRS positioning occasion occurs on signals received from various neighbor cells relative to PRS positioning occasions for the reference cell, and to determine the PRS sequence transmitted from various cells in order to measure a signal Time of Arrival (TOA), RSTD, Rx-Tx or RSRP.

Using the RSTD, Rx-Tx, RSRP and/or other measurements of PRS signals, and one or more of the known absolute or relative transmission timing of each cell, the directions of any directional beam formed PRS transmission, PRS transmission power, and the known position(s) of wireless node physical transmitting antennas for the reference and neighboring cells, the UEs' 105, 205 position may be calculated (e.g., locally by the respective UEs 105, 205, by the location servers 502, 504, or by some other node such as a gNB 110-1, eNB 202, or ng-eNB 114).

For example, the RSTD for a neighbor cell "k" relative to a reference cell "Ref", may be given as ($TOA_k$-$TOA_{Ref}$) where the TOA values may be measured modulo one subframe duration (1 ms) to remove the effects of measuring different subframes at different times. TOA measurements for different cells may then be converted to RSTD measurements (e.g. as defined in 3GPP TS 36.214 entitled "Physical layer; Measurements") and sent to the location server 502, 504 (e.g., the LMF 120, SLP 132 or an E-SMLC 208) by the UE 105 and/or UE 205. Using (i) the RSTD measurements, (ii) the known absolute or relative transmission timing of each cell, (iii) the known position(s) of physical transmitting antennas for the reference and neighboring cells, and/or (iv) PRS characteristics, the UEs' 105, 205 positions may be determined.

Figure 7:
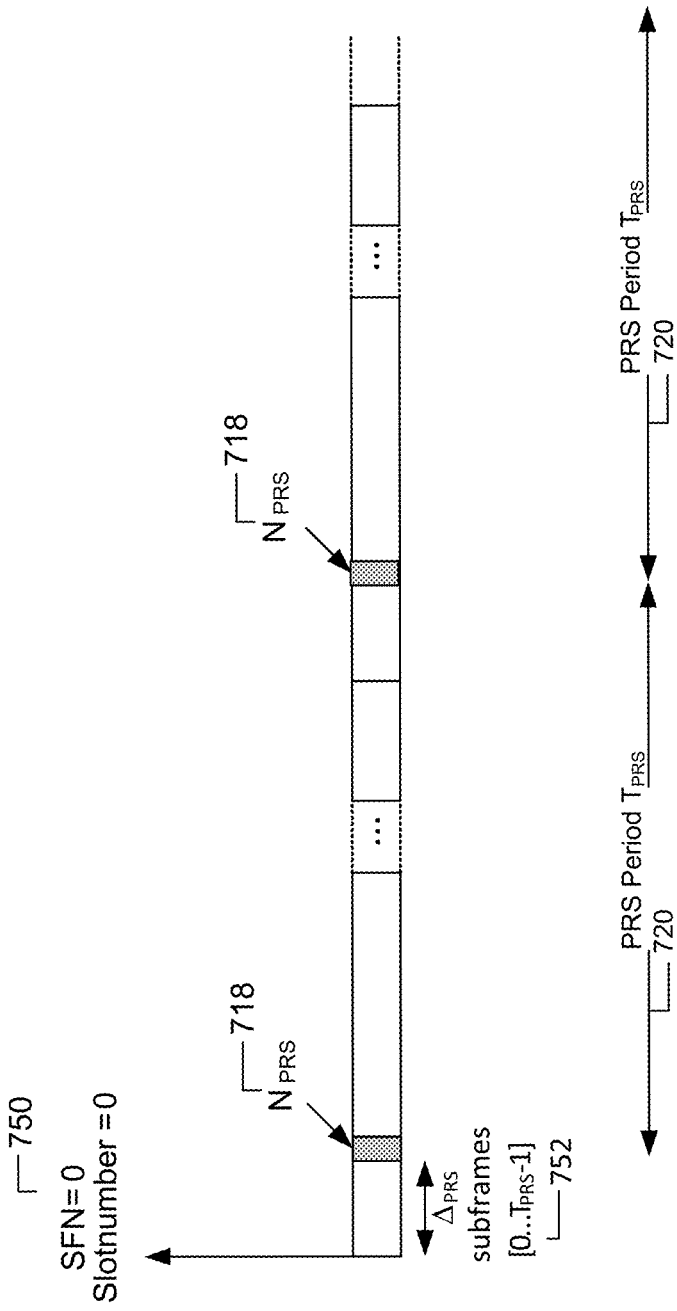
FIG. 7 is a diagram illustrating further aspects of PRS transmission for a cell supported by a wireless node.

Referring to FIG. 7, with further references to FIG. 6, aspects of PRS transmission for a cell supported by a wireless node are shown. PRS transmission for LTE is assumed in FIG. 7 although the same or similar aspects of PRS transmission to those shown in and described for FIG. 7 may apply to 5G NR and/or other wireless technologies. FIG. 7 shows how PRS positioning occasions are determined by a System Frame Number (SFN), a cell specific subframe offset (APRs)) and the PRS Periodicity ($T_{PRS}$) 720. Typically, the cell specific PRS subframe configuration is defined by a "PRS Configuration Index" $I_{PRS}$ included in assistance data sent to a UE 105 or 205. The PRS Periodicity ($T_{PRS}$) 720 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \quad (1)$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity, and $\Delta_{PRS}$ is the cell-specific subframe offset.

As shown in FIG. 7, the cell specific subframe offset $\Delta_{PRS}$ 752 may be defined in terms of the number of subframes transmitted starting from System Frame Number 0 (Slot 'Number 0', marked as slot 750) to the start of the first (subsequent) PRS positioning occasion. In FIG. 7, the number of consecutive positioning subframes 718 ($N_{PRS}$) equals 4.

In some embodiments, when a UE 105, 205 receives a PRS configuration index $I_{PRS}$ in the assistance data for a particular cell, the UEs 105, 205 may determine the PRS periodicity $T_{PRS}$ and PRS subframe offset $\Delta_{PRS}$ using Table 1. The UEs 105, 205 may then determine the radio frame, subframe and slot when a PRS is scheduled in the cell (e.g., using equation (1)). The assistance data may be determined by, for example, the LMF 120, the SLP 132 or the E-SMLC 208 (e.g. the location server 502 or 504) and includes assistance data for a reference cell, and a number of neighbor cells supported by various wireless nodes.

Typically, PRS occasions from all cells in a network that use the same frequency are aligned in time and may have a fixed known time offset relative to other cells in the network that use a different frequency. In SFN-synchronous networks all wireless nodes (e.g. gNBs 110, ng-eNBs 114, eNBs, etc.) may be aligned (e.g. precisely as described later for FIG. 9A) on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number (e.g. either approximately or precisely as described later for FIG. 9A). Thus, in SFN-asynchronous networks the PRS configuration index for each cell may be configured separately by the network so that PRS occasions align in time.

The UEs 105, 205 may determine the timing of the PRS occasions of the reference and neighbor cells for positioning (e.g. for OTDOA or multi-RTD), if the UEs 105, 205 can obtain the cell timing (e.g., SFN or Frame Number) of at least one of the cells, e.g., the reference cell or a serving cell (e.g. which may be performed as part of action 520 in FIG. 5). The timing of the other cells may then be derived by the UEs 105, 205 based, for example, on the assumption that PRS occasions from different cells overlap.

As defined by 3GPP (e.g., in 3GPP TS 36.211), for LTE systems, the sequence of subframes used to transmit PRS (e.g., for OTDOA, AOD or multi-RTT positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355 and TS 37.355.

Figure 8:
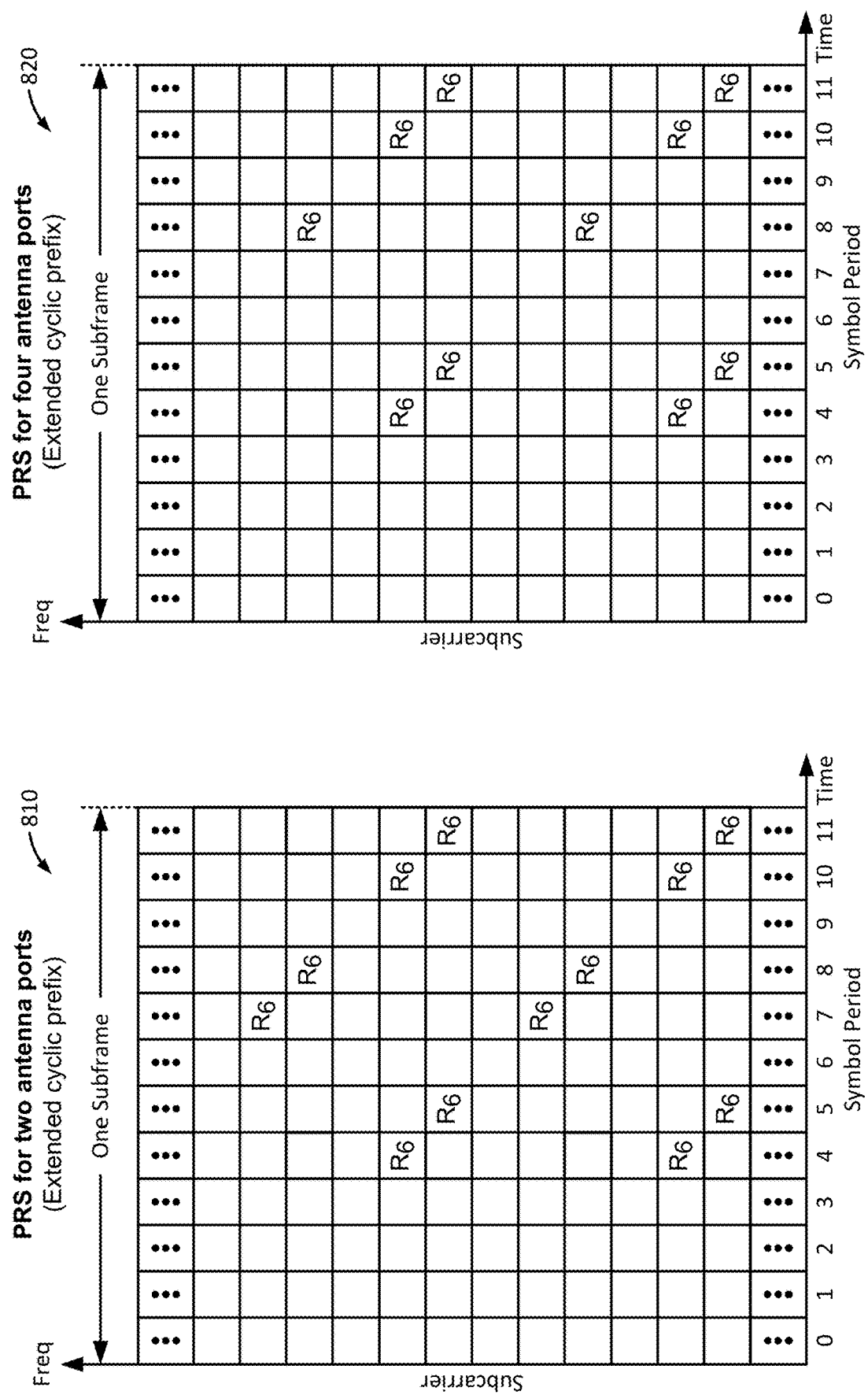
FIG. 8 is an illustration of example subframe formats for positioning reference signal (PRS) transmission.

Referring to FIG. 8, with further reference to FIGS. 6 and 7, example subframe formats for PRS transmission are shown. FIG. 8 shows two subframe formats 810 and 820 for the PRS for the normal cyclic prefix in LTE, according to aspects of the present disclosure. A subframe may include 14 symbol periods with indices 0 to 13 for the normal cyclic prefix. Subframe format 810 may be used for a cell having one or two antenna ports for a Physical Broadcast Channel (PBCH). Subframe format 820 may be used for a cell having four antenna ports for the PBCH. For both subframe formats 810 and 820, a cell may transmit the PRS on antenna port 6 on each resource element with label $R_6$ in FIG. 8. Extended cyclic prefix include subframes with 12 symbol periods and indices 0 to 11 may also be used (not shown in FIG. 8). In a DSS application, a 4G LTE network and a 5G NR network may utilize orthogonal codes (also referred to as orthogonal code sequences and orthogonal PRS code sequences) in their respective PRS transmissions such that each can be decoded individually in the same resource element without mutual interference.

Figure 9A:
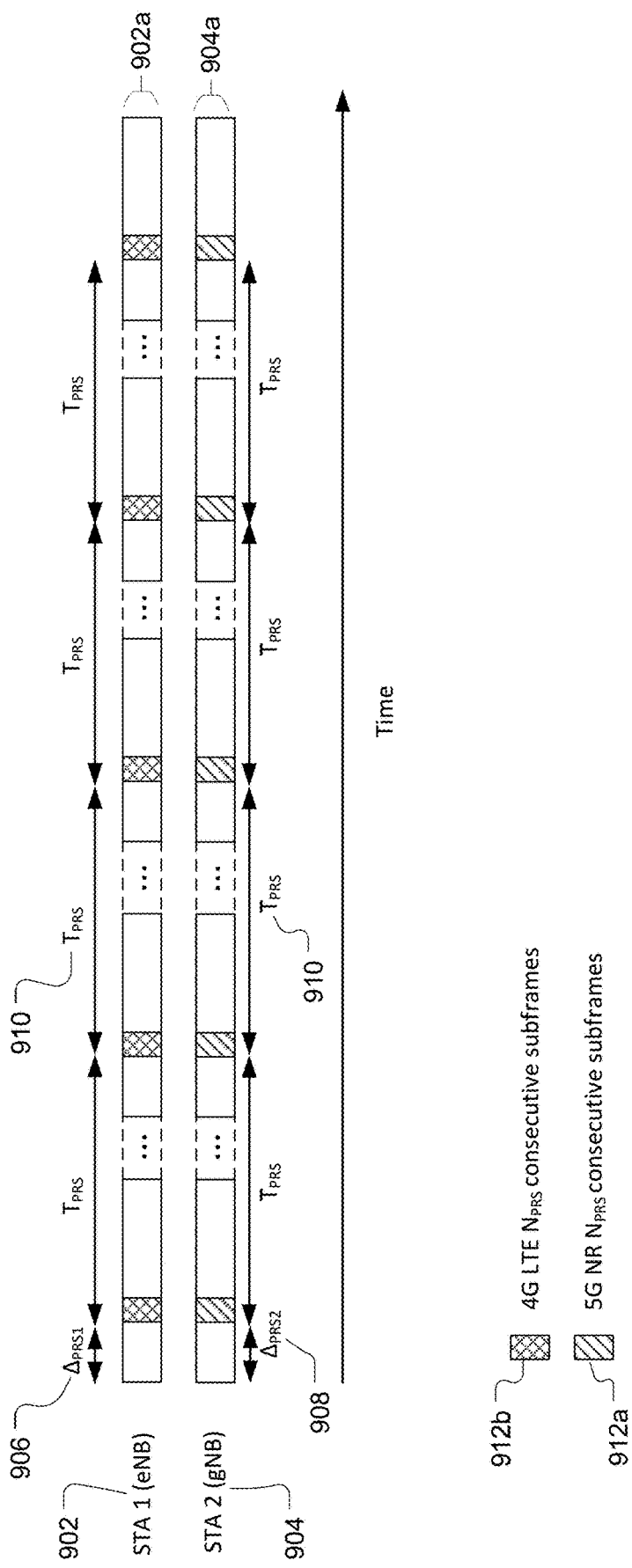
FIG. 9A is an illustration of example PRS transmission schedules transmitted on two different radio access technologies.

Referring to FIG. 9A, with further reference to FIGS. 1-8, example PRS transmission schedules transmitted on two different radio access technologies are shown. A first station (STA 1) 902 is an example of a base station operating on a first radio access technology, such as the eNB 202 operating in a 4G LTE network or the ng-eNB 114 operating in an LTE network connected to a 5GC 140. A second station (STA 2) 904 is an example of a base station operating on a second radio access technology, such as gNB 110-1 operating in a 5G NR network. In a DSS implementation, the first station 902 and the second station 904 may be operating in the same frequency band. The first station 902 and the second station 904 are transmitting on a PRS transmission schedule with two different cell specific subframe offsets (e.g., $\Delta_{PRS1}$, $\Delta_{PRS2}$) according to a PRS Configuration Index $I_{PRS}$ Table 1. The PRS transmission schedule may include, for example, a PRS Periodicity ($T_{PRS}$) 910 value of 160 subframes and the number of consecutive positioning subframes ($N_{PRS}$) which define the positioning occasions 912a-b may equal 4. Other $\Delta_{PRS}$, $T_{PRS}$, and $N_{PRS}$ values may be provided in assistance data (e.g., the PRS broadcast data 514a-b and/or assistance data 516a-b) to define the subframe configurations 902a, 904a and the corresponding positioning occasions 912a-b. The PRS periodicity $T_{PRS}$ and the subframe offset $\Delta_{PRS}$ may be conveyed via a PRS configuration index $I_{PRS}$. The PRS configuration index and the PRS duration may be configured independently by higher layers. As will be described in FIG. 9B, each PRS occasion may be enabled or muted, for example, the UE may apply a muting bit to each cell. Cells that may be muted in the next PRS occasion should not be measured.

As illustrated in FIG. 9A, the 4G LTE positioning occasions 912b and the 5G NR positioning occasions 912a may be aligned in time (i.e. may occur at the same sequence of times) based on the cell specific subframe offsets (e.g., $\Delta_{PRS1}$, $\Delta_{PRS2}$). The alignment in time may be needed to avoid transmission of 4G PRS at positioning occasions 912b by STA 1 902 which overlap with data transmission and other signaling to and from STA 2 904, which may create interference (due to the use of shared spectrum for DSS) for either or both of the 4G PRS for STA 1 902 and the data and other signaling for STA 2 904. Similarly, the alignment in time may avoid transmission of 5G PRS at positioning occasions 912a by STA 2 904 which overlap with data transmission and other signaling to and from STA 1 902, which may create interference for either or both of the 5G PRS for STA 2 904 and the data and other signaling for STA 1 902. The alignment in time of positioning occasions 912a and 912b may be precise (e.g. with 1 ms subframes aligned to within 100 nanoseconds of each other or less) or may be approximate (e.g. with 1 ms subframes aligned to within 100 microseconds of each other or less). Precise alignment may be useful to support OTDOA positioning, whereas approximate alignment which may be simpler to achieve, and may suffice for multi-RTT or AOD positioning.

In order to avoid (or reduce) interference between the 4G LTE positioning occasions 912b and the 5G NR positioning occasions 912a, one or more of (i) a different (e.g. orthogonal) PRS code sequence, (ii) a different frequency shift, or (iii) a different frequency hopping sequence may be used for each of the 4G LTE positioning occasions 912b and the 5G NR positioning occasions 912a than for the some or all of the other 4G LTE positioning occasions 912b and the 5G NR positioning occasions 912a.

In FIG. 5, a 4G LTE based UE (e.g., the UE 205) may receive assistance data from the 4G LTE location server 504 (e.g., the broadcast at action 514b, or the LPP Provide Assistance Data message at action 516b) and be configured to only measure (at action 520) the 4G LTE positioning occasions 912b. A 5G NR based UE (e.g., the UE 105) may receive assistance data from either of location servers 502, 504 and may be configured to measure (e.g. at action 520) either or both of the positioning occasions 912a-b. The 5G NR based UE 105 may also be configured to provide the resulting measurement data to either of the location servers 502, 504. The positioning occasions 912a-b illustrated in FIG. 9A enables efficient positioning of the UE's 105, 205 in a DSS implementation because the subframe configuration process supports different radio access technologies, such as the existing 4G LTE networks and the evolving 5G NR networks.

Figure 9B:
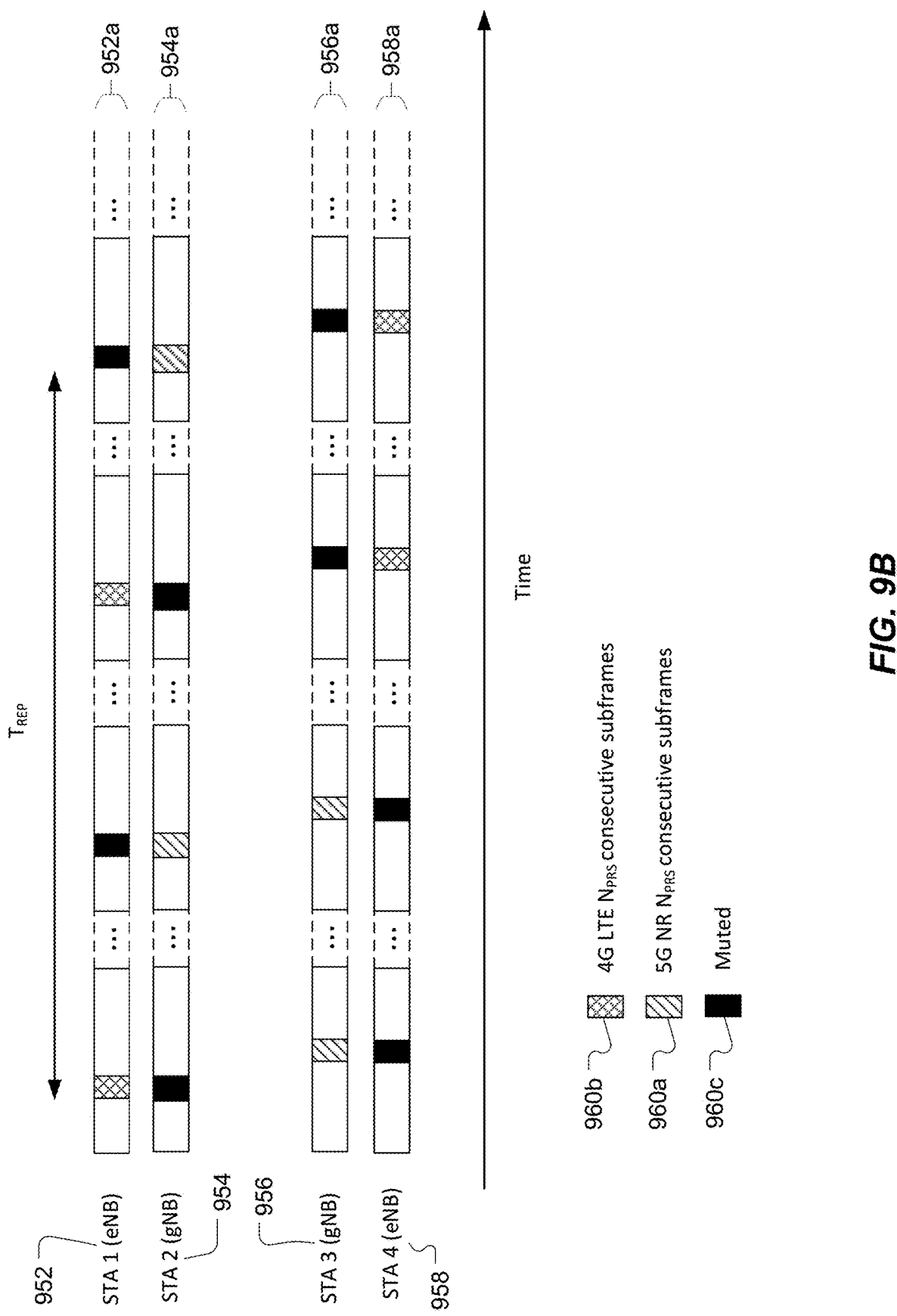
FIG. 9B is an illustration of example PRS transmission schedules on four cells with PRS muting patterns.

Referring to FIG. 9B, with further reference to FIGS. 1-9A, example PRS transmission schedules on four cells with PRS muting patterns are shown. A first base station 952 (e.g. an eNB 202) operating in a first radio access technology (e.g., 4G LTE) and a second base station 954 (e.g. a gNB 110) operating on a second radio access technology (e.g., 5G NR) are located proximate to one another such that transmissions from the stations may interfere with one another. A third base station 956 (e.g. another gNB 110) configured to operate on the second radio access technology (e.g., 5G NR), and a fourth base station 958 (e.g. another eNB 202) configured to operate on the first radio access technology (e.g., 4G LTE) are located proximate to one another such that transmissions from the stations may interfere with one another. The first and second base stations 952, 954 and the third and fourth base stations 956, 958 may be far enough apart such that they do not interfere with each other. While the muting concepts discussed herein are applied to two sets of two stations to simplify the description, in operation, muting patterns may be generated for larger networks where there is increased potential of multiple stations interfering with one another.

In a first example, the first station 952 may transmit according to a first PRS transmission schedule 952a. The first PRS transmission schedule 952a may be based on the PRS Configuration Index $I_{PRS}$ is noted in Table 1 and depicted in FIG. 9A. The second station 954 may transmit a second PRS transmission schedule 954a which is based on other configuration parameters. For example, the $\Delta_{PRS}$, $T_{PRS}$, and $N_{PRS}$ values in the second PRS transmission schedule 954a may be the same as the values associated with the first PRS transmission schedule 952a (e.g., different subcarrier spacing). In an embodiment, the configuration parameters of the second PRS transmission schedule 954a may be based on a different model than the first PRS transmission schedule 952a and thus the relationship between the PRS transmission schedules 952a, 954a may be asynchronous. The first and second PRS transmission schedules 952a, 954a may include instances where one or more of the subframes in the 4G LTE positioning occasions 960b and the 5G NR positioning occasions 960a overlap in the time domain, as described for FIG. 9A. The first and second PRS transmission schedules 952a, 954a may then include muting patterns to ensure that the transmissions from the first and second stations 952, 954 do not interfere with one another due to being orthogonal in the time domain. For example, certain PRS subframes/occasions may be muted—in which a base station or a cell for a base station may not transmit and/or a UE 105 or 205 may not monitor for PRS from this base station or cell. Typically, a PRS muting configuration is defined by a periodic PRS muting sequence with periodicity $T_{REP}$, where $T_{REP}$, counted in number of PRS occasions (subframes), can be 2, 4, 8, or 16 which may be represented by a 2, 4, 8, or 16 bit string, respectively, that represents the PRS muting sequence. For a PRS periodicity of 1280 ms, the maximum value of $T_{REP}$ may be 8; not 16. If a bit in the PRS muting sequence is set to "0", then the PRS is muted in the corresponding PRS occasion/subframe(s). A PRS muting sequence may be configured for each cell in the network. Typically, the sequence length and the exact pattern of a PRS muting sequence can be based on algorithms which takes into account the number of neighbor cells in the proximity of the given cell that will transmit during the same subframe. In an example, the algorithms may be configured to determine muting sequences based on potential asynchronous PRS transmission schedules generated by different radio access technologies. A muting sequence associated with the first base station 952 may be <1010>, and a muting sequence associated with the second base station 954 may be <0101>. The muting sequences may be included in the assistance data (e.g., 514a-b, 516a-b) provided by the locations servers 502, 504.

The third and fourth base stations 956, 958 are both configured to transmit respective PRS transmission schedules 956a, 958a that are synchronized based on the PRS Configuration Index $I_{PRS}$ noted in Table 1 and depicted in FIG. 9A. The PRS occasions in each of the PRS transmission schedules 956a, 958a are synchronized. Since proximate 4G LTE configured UEs (e.g., UE 205) cannot decode the 5G NR $N_{PRS}$ subframes, a muting pattern of <1100> may be provided to the third station 956 which will mute the transmission of the third and fourth $N_{PRS}$ subframes in the third transmission schedule 956a. Additionally, the proximate 4G LTE configured UEs may receive a muting pattern of <0011> associated with the fourth base station 958 to indicate that they should only expect the transmission of the third and fourth $N_{PRS}$ subframes in the fourth transmission schedule 958a. In an example, the fourth base station 958 may also have a muting pattern of <0011> to mute the transmission of the first and second positioning occasions in the fourth transmission schedule 958a to avoid interference with the first and second positioning occasions in the third transmission schedule 956a. Proximate 5G configured UEs (e.g., UE 105) may be configured to utilize the non-muted positioning occasions in one or both of the PRS transmission schedules 956a, 958a.

In an example, a 5G UE 105 may be configured to decode both 4G LTE and 5G NR $N_{PRS}$ subframes. In this example, providing the PRS offsets (e.g., vshift) for the positioning occasions in the third and fourth transmission schedules 956a, 958a to a 5G UE 105 (e.g. at action 514a, 514b, 516a or 516b in FIG. 5) may enable separation of the 4G LTE and 5G NR $N_{PRS}$ subframes in the frequency domain. Additionally or alternatively, the proximate 5G UE 105 may be configured to obtain measurements from the third base station 956 during the first and second positioning occasions for the transmission schedule 956a and from the fourth base station 958 during the third and fourth positioning occasions for the fourth transmission schedule 958a. The third station 956 may still require a muting pattern of <1100>, and the proximate 4G UEs may still require to operate with a <0011> muting pattern because the symbols used in the resource elements in the 5G NR $N_{PRS}$ PRS occasions may not be recognized by the 4G UE. Other muting patterns may be used by the base stations and UEs to overcome potential conflicts in the time and frequency domains in the synchronous PRS occasions.

Figure 10:
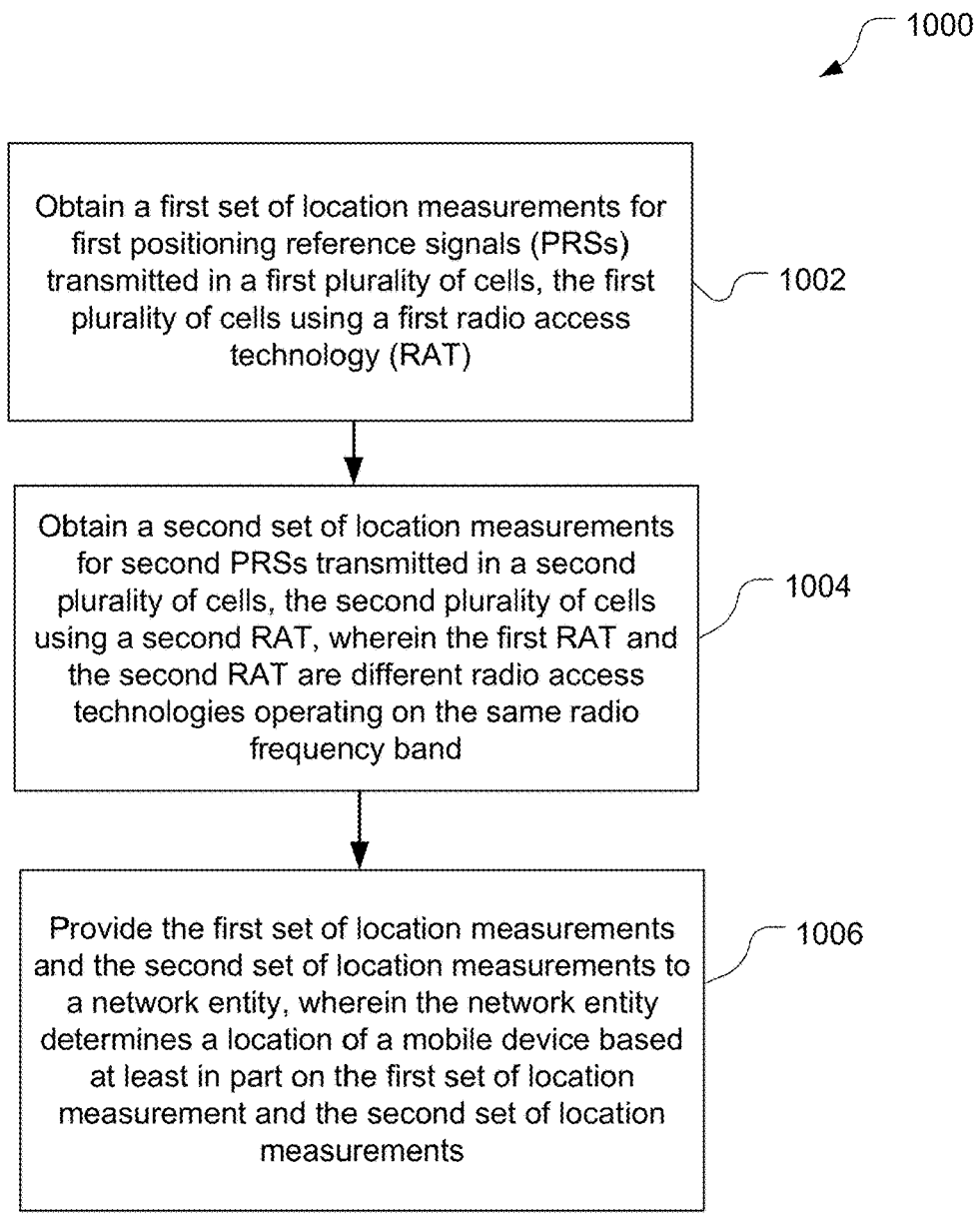
FIG. 10 is a flowchart of an example method, generally performed at a mobile device, to support positioning of the mobile device with dynamic spectrum sharing.

Referring to FIG. 10, with further reference to FIGS. 1-9B, a method 1000, generally performed at a mobile device (e.g. a UE 105, UE 205 or UE 300), to support positioning of the mobile device with dynamic spectrum sharing includes the stages shown. The method 1000 is, however, an example only and not limiting. The method 1000 may be altered, e.g., by having stages added, removed, rearranged, combined, performed concurrently, and/or having single stages split into multiple stages.

At stage 1002, the method includes obtaining a first set of location measurements for first positioning reference signals (PRSs) transmitted in a first plurality of cells, the first plurality of cells using a first radio access technology (RAT). The UE 300, including the transceiver 315, is a means for obtaining a first set of location measurements. In an example, a 5G UE (i.e., UE 105) is configured to receive assistance data for a first RAT such as a 4G LTE network. The UE 105 is configured to receive LTE PRS Broadcasts at action 514b and/or Assistance Data at action 516b from the 4G LTE location server(s) 504 via the eNB 202. The assistance data includes configuration parameters and signal characteristics for PRS signals that are transmitted by the base stations (i.e., eNBs) in the 4G LTE communication system 200. At action 520, the UE 105 is configured to obtain the first set of location measurements from the base stations identified in the assistance data. For example, the first base station may be the eNB 202 configured to operate with the 4G LTE communication system 200 (i.e., the first RAT).

At stage 1004, the method includes obtaining a second set of location measurements for second PRSs transmitted in a second plurality of cells, the second plurality of cells using a second RAT, wherein the first RAT and the second RAT are different radio access technologies operating on the same radio frequency band. For example, the radio frequency band may include frequencies in a range of 600 MHz to 700 MHz or in a range of 2.5 GHz to 3.5 GHz. The UE 300, including the transceiver 315, is a means for obtaining a second set of location measurements. The UE 105 is configured to receive assistance data for a second RAT such as a 5G NR network. The UE 105 is configured to receive NR PRS Broadcasts at action 514a and/or Assistance Data at action 516a from the 5G NR location server(s) 502 via the gNB 110-1. The assistance data includes configuration parameters and signal characteristics for PRS signals that are transmitted by the base stations (i.e., gNBs 110-1, 110-2) in the 5G NR communication system 100. In an example the 4G and 5G communication systems 100, 200 may share low band (e.g., 600-700 MHz) and mid band (2.5-3.5 GHz) radio frequency bands. At action 520, the UE 105 is configured to obtain the second set of location measurements from the 5G base stations identified in the assistance data. For example, the second base station may be the gNB 110-1 configured to operate with the 5G NR communication system 100 (i.e., the second radio access technology). The location measurements obtained at stages 1002 and 1004 may utilize the same radio frequency band (e.g., low or mid cellular bands) and the corresponding PRS positioning occasions may be based on resource elements including symbols associated with the respective first and second RATs. The first set of location measurements and the second set of location measurements may each comprise measurements comprising at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these.

At stage 1006, the method includes providing the first set of location measurements and the second set of location measurements to a network entity, wherein the network entity determines a location of the mobile device based at least in part on the first set of location measurements and the second set of location measurements. The UE 300, including the transceiver 315, is a means for providing the first set of location measurements and the second set of location measurements. In an example, the UE 105 is configured to provide the first and second sets of location measurements to the 5G NR location server(s) 502 via the LPP provide location information action 522a. The 5G NR location server(s) 502 is configured to determine a location of the UE 105 based on the location measurements obtained from the 4G LTE communication system 200, such as from the eNB 202, and the location measurements obtained from the 5G NR communication system 100, such as from the gNB 110-1. While only two base stations are provided in this example, in operation the UE 105 may be configured to obtain measurements from multiple base stations in either of the radio access technologies. In an example, the UE 105 may be configured to determine a location based on the first and second sets of location measurements (local processing). In an embodiment, the 4G LTE communication system 200 may be configured to receive location information and/or measurement data from the UE 105 via a LPP provide location information action 522c. The network entity may be the mobile device—e.g. as described for action 520 in FIG. 5. The network entity may instead be a location server comprising a Location Management Function (LMF), an Enhanced Serving Mobile Location Center (E-SMLC), or a Secure User Plane Location (SUPL) Location Platform (SLP)—e.g. as described for FIG. 5.

In an example, each PRS in the first PRSs and the second PRSs may comprise a sequence of PRS positioning occasions, such that the sequence of PRS positioning occasions for each PRS may occur at the same times as the sequence of PRS positioning occasions for each of other PRSs in the first PRSs and the second PRSs. Each PRS in the first PRSs and the second PRSs may include orthogonal characteristics, such that the orthogonal characteristic reduce interference between the each PRS and other PRSs in the first PRSs and the second PRSs. The orthogonal characteristics may include at least one of a distinct frequency shift, an orthogonal PRS code sequence, a distinct frequency hopping sequence, a distinct muting pattern, or some combination of these. In an example, the orthogonal characteristics may include a distinct muting pattern, such that each PRS is transmitted during PRS positioning occasions in which PRS is not transmitted for some other PRSs in the first PRSs and the second PRSs, and such that each PRS is not transmitted during PRS positioning occasions in which PRS is transmitted for at least some of the some other PRSs in the first PRSs and the second PRSs. In an example, the method 1000 may further include receiving assistance data from a location server, the assistance data including a configuration of each PRS in the first PRSs and the second PRSs, the configuration including an indication of the sequence of PRS positioning occasions and the orthogonal characteristics for the each PRS, wherein the first set of location measurements and the second set of location measurements are based in part on the configuration of each PRS in the first PRSs and the second PRSs.

Figure 11:
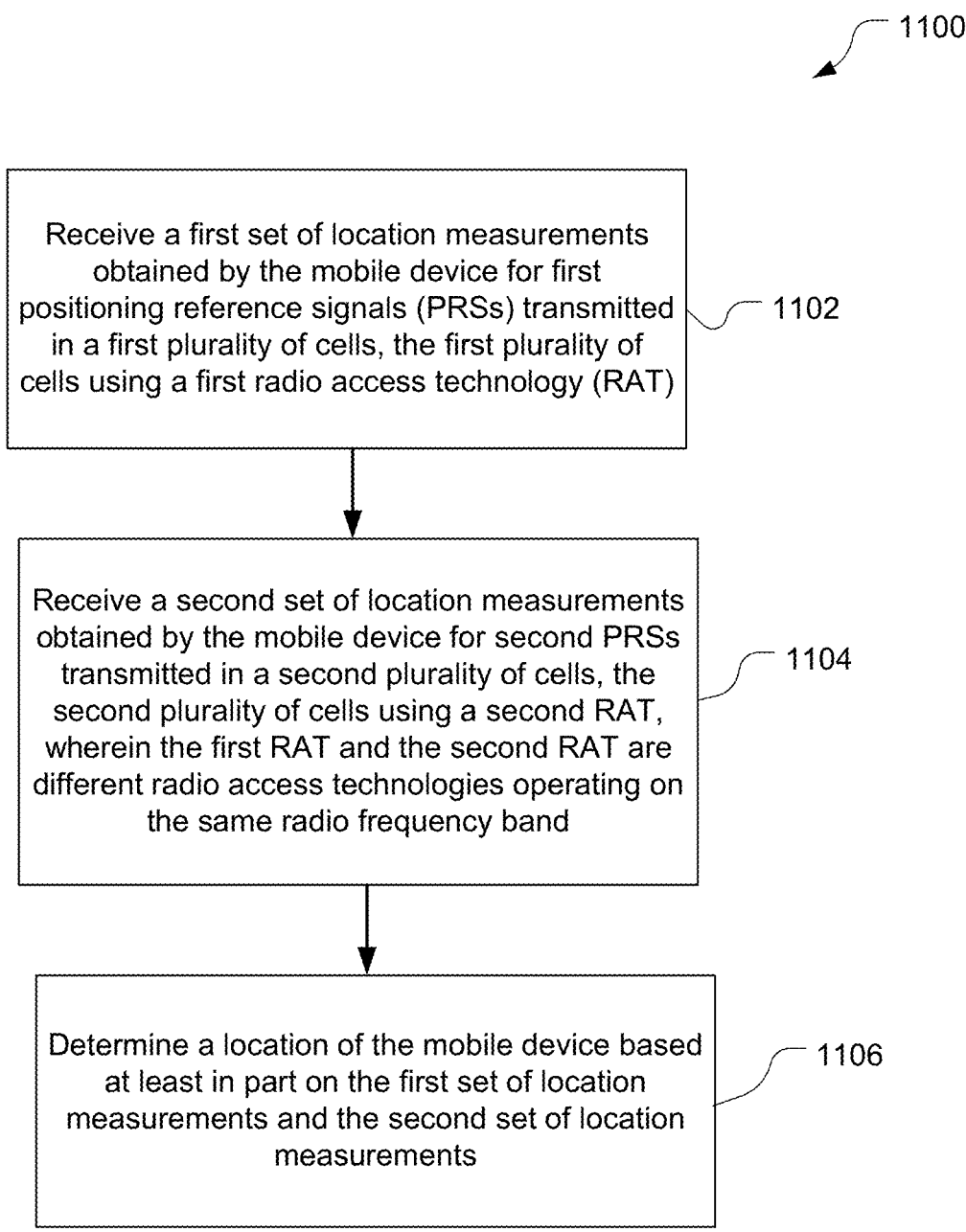
FIG. 11 is a flowchart of an example method, generally performed at a network server, to support positioning of a mobile device with dynamic spectrum sharing.

Referring to FIG. 11, with further reference to FIGS. 1-9B, a method 1100, generally performed at a network server (e.g. an LMF 120, E-SMLC 208, SLP 132 or SLP 232) to support positioning of a mobile device (e.g. a UE 105, UE 205 or UE 300) with dynamic spectrum sharing includes the stages shown. The method 1100 is, however, an example only and not limiting. The method 1100 may be altered, e.g., by having stages added, removed, rearranged, combined, performed concurrently, and/or having single stages split into multiple stages.

At stage 1102, the method includes receiving a first set of location measurements obtained by the mobile device for first positioning reference signals (PRSs) transmitted in a first plurality of cells, the first plurality of cells using a first radio access technology (RAT) such as 4G LTE. The 4G LTE location server 504 and/or the 5G NR location server 502 may be means for receiving the first set of location measurements. In an example, the UE 105 is configured to provide the first of location measurements to the 4G LTE location server 504 or 5G NR location server(s) 502 via the respective LPP provide location information actions 522a, 522c. In an embodiment, a 4G UE 205 may be configured to provide measurement data via a LPP provide location information action 522b.

At stage 1104, the method includes receiving a second set of location measurements obtained by the mobile device for second PRSs transmitted in a second plurality of cells, the second plurality of cells using a second RAT such as 5G NR, wherein the first RAT and the second RAT are different radio access technologies operating on the same radio frequency band. The 4G LTE location server 504 and/or the 5G NR location server 502 may be means for receiving the second set of location measurements. In an example, the UE 105 is configured to provide the first of location measurements to the the 4G LTE location server 504 or 5G NR location server(s) 502 via the respective LPP provide location information actions 522a, 522c. In an embodiment, a 4G UE 205 may be configured to provide measurement data via a LPP provide location information action 522b.

At stage 1106, the method includes determining a location of the mobile device based at least in part on the first set of location measurements and the second set of location measurements The 4G LTE location server 504 and/or the 5G NR location server 502 may be means for determining the location of the mobile device. In an example, the first set of location measurements and the second set of location measurements may each comprise measurements associated with a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these. The 4G LTE location server 504 and the 5G NR location server 502 are configured to utilize the measurement to determine the location of one or more of the mobile devices 105, 205 as known in the art.

In an aspect, each PRS in the first PRSs and the second PRSs may comprise a sequence of PRS positioning occasions, where the sequence of PRS positioning occasions for each PRS occur at the same times as the sequence of PRS positioning occasions for each of other PRSs in the first PRSs and the second PRSs. In this aspect, each PRS in the first PRSs and the second PRSs may include orthogonal characteristics, where the orthogonal characteristic reduce interference between the each PRS and other PRSs in the first PRSs and the second PRSs. The orthogonal characteristics may include at least one of a distinct frequency shift, an orthogonal PRS code sequence, a distinct frequency hopping sequence, a distinct muting pattern, or some combination of these. The orthogonal characteristics may include a distinct muting pattern, where the each PRS is transmitted during PRS positioning occasions in which PRS is not transmitted for some other PRSs in the first PRSs and the second PRSs, and where the each PRS is not transmitted during PRS positioning occasions in which PRS is transmitted for at least some of the some other PRSs in the first PRSs and the second PRSs. The method may further comprising sending assistance data to the mobile device, where the assistance data includes a configuration of each PRS in the first PRSs and the second PRSs, the configuration including an indication of the sequence of PRS positioning occasions and the orthogonal characteristics for the each PRS, and where the first set of location measurements and the second set of location measurements are obtained by the mobile device based in part on the configuration of each PRS in the first PRSs and the second PRSs.

Figure 12:
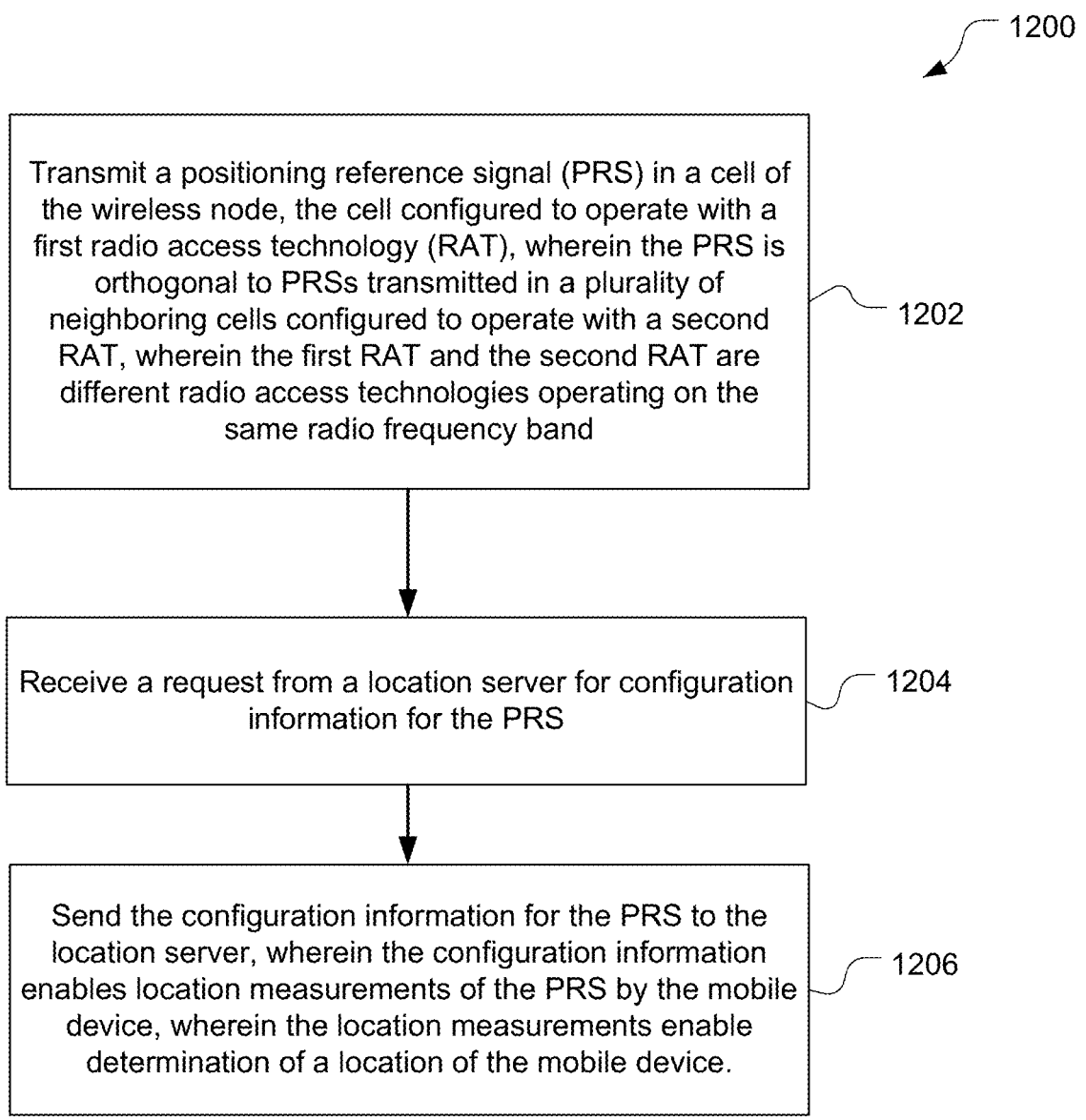
FIG. 12 is a flowchart of an example method, generally performed at a wireless node, to facilitate positioning of a mobile device with dynamic spectrum sharing.

Referring to FIG. 12, with further reference to FIGS. 1-9B, a method 1200, generally performed at a wireless node (e.g. a gNB 110, eNB 202 or ng-eNB 114), to facilitate positioning of a mobile device (e.g. a UE 105, UE 205 or UE 300) with dynamic spectrum sharing includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes transmitting a positioning reference signal (PRS) in a cell of the wireless node, the cell configured to operate with a first radio access technology (RAT), wherein the PRS is orthogonal to PRSs transmitted in a plurality of neighboring cells configured to operate with a second RAT, wherein the first RAT and the second RAT are different radio access technologies operating on the same radio frequency band. The gNB 110-1 and the eNB 202 are examples of means for transmitting the PRS. The location servers 502, 504, or other networked server 400 operably coupled to the backhaul 506, or an O&M server 506, may be configure to generate a PRS transmission schedule and provide the PRS transmission schedule to a first base station such as the eNB 202 on a 4G LTE network (i.e., the first RAT) and a second base station such as the gNB 110-1 on a 5G NR network (i.e., the second RAT). In an example, the radio frequency band may include frequencies in a range of 600 MHz to 700 MHz or in a range of 2.5 GHz to 3.5 GHz.

At stage 1204, the method includes receiving a request from a location server (e.g. an LMF 120, E-SMLC 208, SLP 132 or SLP 232) for configuration information for the PRS. The gNB 110-1 and the eNB 202 are examples of means for receiving the request from the location server. Based on the position method(s) selected and/or on assistance data indicated by a UE (e.g., UEs 105, 205), the location servers 502, 504 may determine assistance data for the UEs 105, 205 to support the selected position method(s). The 5G NR location server 502 may then send an NRPPa Information Request message to the serving gNB 110-1 at action 510*a*, and the 4G LTE location server 504 may send a LPPa Information Request message to the serving eNB 202 at action 510*b*. The NRPPa and LPPa Information Requests 510*a-b* may request respective location related information for gNB 110-1 and the eNB 202. For example, the location related information may include the respective locations of the gNB 110-1 and eNB 202, the PRS configuration parameters for the gNB 110-1 and the eNB 202, and/or information concerning broadcast of assistance data by the gNB 110-1 and the eNB 202. The NRPPa and LPPa Information Requests at actions 510*a-b* may include a request for configuration parameters related to PRSs (e.g., signal characteristics for each PRS transmitted by the gNB 110-1 and eNB 202).

At stage 1206, the method includes sending the configuration information for the PRS to the location server, wherein the configuration information enables location measurements of the PRS by the mobile device, wherein the location measurements enable determination of a location of the mobile device. For example, the location measurements may comprise measurements of at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these.

The gNB 110-1 and the eNB 202 are examples of means for sending the configuration information for the PRS to the location server at stage 1206. In an example, a serving gNB 110-1 may respond to the request received at stage 1204 with an NRPPa Information Response message at action 512*a*, and the serving node eNB 202 may be configured to respond with a LPPa Information Response message at action 512*b*. The NRPPa and LPPa Information Responses may be configured to provide some or all of the location related information requested at stage 1204. For example, when configuration parameters for PRSs are requested at stage 1204, configuration information including signal characteristics and other configuration information for each PRS supported by the respective gNB 110-1 and eNB 202 may be provided at stage 1206.

The PRS transmitted at stage 1202 may comprise a sequence of PRS positioning occasions, wherein the sequence of PRS positioning occasions occur at the same times as PRS positioning occasions for each of the PRSs transmitted in the plurality of neighboring cells. The PRS may also include orthogonal characteristics, such that the orthogonal characteristics reduce interference between the PRS and the PRSs transmitted in the plurality of neighboring cells. The orthogonal characteristics may include, for example, a distinct frequency shift, an orthogonal PRS code sequence, a distinct frequency hopping sequence, a distinct muting pattern, or some combination of these. The orthogonal characteristics may include a distinct muting pattern, where the PRS is transmitted during PRS positioning occasions in which PRS is not transmitted in at least some first cells of the plurality of neighboring cells, and where the PRS is not transmitted during PRS positioning occasions in which PRS is transmitted in at least some second cells of the plurality of neighboring cells.

In an example, the wireless node may be an evolved NodeB (eNB), the first RAT may be 4G Long Term Evolution (LTE), the second RAT may be 5G New Radio (NR), and the location server may be an Enhanced Serving Mobile Location Center (E-SMLC) or a Secure User Plane Location (SUPL) Location Platform (SLP). In another example, the wireless node may be a New Radio (NR) NodeB (gNB), the first RAT may be 5G NR, the second RAT may be 4G Long Term Evolution (LTE), and the location server may be a Location Management Function (LMF) or a Secure User Plane Location (SUPL) Location Platform (SLP). In another example, the wireless node may be a Next Generation evolved NodeB (ng-eNB), the first RAT may be Long Term Evolution (LTE), the second RAT may be 5G New Radio (NR), and the location server may be a Location Management Function (LMF) or a Secure User Plane Location (SUPL) Location Platform (SLP).

In an aspect, receiving the request from the location server and sending the configuration information to the location server may use messages for a New Radio Positioning Protocol A (NRPPa).

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C," or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

Further, more than one invention may be disclosed.

What is claimed is:

1. A method, at a network server, to support positioning of a mobile device with dynamic spectrum sharing, comprising:
   receiving a first set of location measurements obtained by the mobile device for first positioning reference signals (PRSs) transmitted in a first plurality of cells, the first plurality of cells using a first radio access technology (RAT);
   receiving a second set of location measurements obtained by the mobile device for second PRSs transmitted in a second plurality of cells, the second plurality of cells using a second RAT, wherein the first RAT and the second RAT are different radio access technologies operating on the same radio frequency band, with the first set of location measurements corresponding to first PRS positioning occasions of the first PRSs scheduled for occurrence at the same time with second PRS positioning occasions of the second PRSs corresponding to the second set of location measurements; and
   determining a location of the mobile device based at least in part on the first set of location measurements and the second set of location measurements.

2. The method of claim 1, wherein the first RAT is 4G Long Term Evolution (LTE) and the second RAT is 5G New Radio (NR).

3. The method of claim 1, wherein the network server comprises a Location Management Function (LMF), an Enhanced Serving Mobile Location Center (E-SMLC), or a Secure User Plane Location (SUPL) Location Platform (SLP).

4. The method of claim 1, wherein the first set of location measurements and the second set of location measurements each comprise measurements comprising at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these.

5. The method of claim 1, wherein each PRS in the first PRSs and the second PRSs comprises a sequence of PRS positioning occasions, wherein the sequence of PRS positioning occasions for each PRS occur at the same times as the sequence of PRS positioning occasions for each of other PRSs in the first PRSs and the second PRSs.

6. The method of claim 1, wherein each PRS in the first PRSs and the second PRSs includes orthogonal characteristics, wherein the orthogonal characteristics reduce interference between the each PRS and other PRSs in the first PRSs and the second PRSs.

7. The method of claim 6, wherein the orthogonal characteristics include at least one of a distinct frequency shift, an orthogonal PRS code sequence, a distinct frequency hopping sequence, a distinct muting pattern, or some combination of these.

8. The method of claim 6, wherein the orthogonal characteristics include a distinct muting pattern, wherein the each PRS is transmitted during PRS positioning occasions in which PRS is not transmitted for some other PRSs in the first PRSs and the second PRSs, wherein the each PRS is not transmitted during PRS positioning occasions in which PRS is transmitted for at least some of the some other PRSs in the first PRSs and the second PRSs.

9. The method of claim 8, further comprising sending assistance data to the mobile device, the assistance data including a configuration of each PRS in the first PRSs and the second PRSs, the configuration including an indication of the PRS positioning occasions and the orthogonal characteristics for the each PRS, wherein the first set of location measurements and the second set of location measurements are obtained by the mobile device based in part on the configuration of each PRS in the first PRSs and the second PRSs.

10. The method of claim 1, wherein the radio frequency band includes frequencies in a range of 600 MHz to 700 MHz or in a range of 2.5 GHz to 3.5 GHz.

11. An apparatus, comprising:
   a memory;
   a transceiver;
   a processor communicatively coupled to the memory and the transceiver and configured to:
      receive a first set of location measurements obtained by a mobile device for first positioning reference signals (PRSs) transmitted in a first plurality of cells, the first plurality of cells using a first radio access technology (RAT);
      receive a second set of location measurements obtained by the mobile device for second PRSs transmitted in a second plurality of cells, the second plurality of cells using a second RAT, wherein the first RAT and the second RAT are different radio access technologies operating on the same radio frequency band, with the first set of location measurements corresponding to first PRS positioning occasions of the first PRSs scheduled for occurrence at the same time with second PRS positioning occasions of the second PRSs corresponding to the second set of location measurements; and
      determine a location of the mobile device based at least in part on the first set of location measurements and the second set of location measurements.

12. The apparatus of claim 11 wherein the first RAT is 4G Long Term Evolution (LTE) and the second RAT is 5G New Radio (NR).

13. The apparatus of claim 11, wherein the apparatus comprises a Location Management Function (LMF), an Enhanced Serving Mobile Location Center (E-SMLC), or a Secure User Plane Location (SUPL) Location Platform (SLP).

14. The apparatus of claim 11, wherein the first set of location measurements and the second set of location measurements each comprise measurements comprising at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these.

15. The apparatus of claim 11, wherein each PRS in the first PRSs and the second PRSs comprises a sequence of PRS positioning occasions, wherein the sequence of PRS positioning occasions for each PRS occur at the same times as the sequence of PRS positioning occasions for each of other PRSs in the first PRSs and the second PRSs.

16. The apparatus of claim 11, wherein each PRS in the first PRSs and the second PRSs includes orthogonal characteristics, wherein the orthogonal characteristics reduce interference between the each PRS and other PRSs in the first PRSs and the second PRSs.

17. The apparatus of claim 16, wherein the orthogonal characteristics include at least one of a distinct frequency shift, an orthogonal PRS code sequence, a distinct frequency hopping sequence, a distinct muting pattern, or some combination of these.

18. The apparatus of claim 16, wherein the orthogonal characteristics include a distinct muting pattern, wherein the each PRS is transmitted during PRS positioning occasions in which PRS is not transmitted for some other PRSs in the first PRSs and the second PRSs, wherein the each PRS is not transmitted during PRS positioning occasions in which PRS is transmitted for at least some of the some other PRSs in the first PRSs and the second PRSs.

19. The apparatus of claim 18, wherein the processor is further configured to send assistance data to the mobile device, the assistance data including a configuration of each PRS in the first PRSs and the second PRSs, the configuration including an indication of the sequence of PRS positioning occasions and the orthogonal characteristics for the each PRS, wherein the first set of location measurements and the second set of location measurements are obtained by the mobile device based in part on the configuration of each PRS in the first PRSs and the second PRSs.

20. The apparatus of claim 11, wherein the radio frequency band includes frequencies in a range of 600 MHz to 700 MHz or in a range of 2.5 GHz to 3.5 GHZ.

21. An apparatus, comprising:
means for receiving a first set of location measurements obtained by a mobile device for first positioning reference signals (PRSs) transmitted in a first plurality of cells, the first plurality of cells using a first radio access technology (RAT);
means for receiving a second set of location measurements obtained by the mobile device for second PRSs transmitted in a second plurality of cells, the second plurality of cells using a second RAT, wherein the first RAT and the second RAT are different radio access technologies operating on the same radio frequency band, with the first set of location measurements corresponding to first PRS positioning occasions of the first PRSs scheduled for occurrence at the same time with second PRS positioning occasions of the second PRSs corresponding to the second set of location measurements; and
means for determining a location of the mobile device based at least in part on the first set of location measurements and the second set of location measurements.

22. The apparatus of claim 21, wherein the first RAT is 4G Long Term Evolution (LTE) and the second RAT is 5G New Radio (NR).

23. The apparatus of claim 21, wherein the apparatus comprises a Location Management Function (LMF), an Enhanced Serving Mobile Location Center (E-SMLC), or a Secure User Plane Location (SUPL) Location Platform (SLP).

24. The apparatus of claim 21, wherein the first set of location measurements and the second set of location measurements each comprise measurements comprising at least one of a Time of Arrival (TOA), a Received Signal Strength Indication (RSSI), a Round Trip signal propagation Time (RTT), a Reference Signal Time Difference (RSTD), a Reference Signal Received Power (RSRP), a Receive Time-Transmission Time difference (Rx-Tx), a Reference Signal Received Quality (RSRQ), or some combination of these.

25. The apparatus of claim 21, wherein each PRS in the first PRSs and the second PRSs comprises a sequence of PRS positioning occasions, wherein the sequence of PRS positioning occasions for each PRS occur at the same times as the sequence of PRS positioning occasions for each of other PRSs in the first PRSs and the second PRSs.

26. The apparatus of claim 21, wherein each PRS in the first PRSs and the second PRSs includes orthogonal characteristics, wherein the orthogonal characteristics reduce interference between the each PRS and other PRSs in the first PRSs and the second PRSs.

27. The apparatus of claim 26, wherein the orthogonal characteristics include at least one of a distinct frequency shift, an orthogonal PRS code sequence, a distinct frequency hopping sequence, a distinct muting pattern, or some combination of these.

28. The apparatus of claim 26, wherein the orthogonal characteristics include a distinct muting pattern, wherein the each PRS is transmitted during PRS positioning occasions in which PRS is not transmitted for some other PRSs in the first PRSs and the second PRSs, wherein the each PRS is not transmitted during PRS positioning occasions in which PRS is transmitted for at least some of the some other PRSs in the first PRSs and the second PRSs.

29. The apparatus of claim 28, further comprising means for sending assistance data to the mobile device, the assistance data including a configuration of each PRS in the first PRSs and the second PRSs, the configuration including an indication of the sequence of PRS positioning occasions and the orthogonal characteristics for the each PRS, wherein the first set of location measurements and the second set of location measurements are obtained by the mobile device based in part on the configuration of each PRS in the first PRSs and the second PRSs.

30. The apparatus of claim 21, wherein the radio frequency band includes frequencies in a range of 600 MHz to 700 MHz or in a range of 2.5 GHz to 3.5 GHz.

31. A non-transitory processor-readable storage medium comprising processor-readable instructions configured to cause one or more processors to support positioning of a mobile device with dynamic spectrum sharing, comprising:
code for receiving a first set of location measurements obtained by the mobile device for first positioning reference signals (PRSs) transmitted in a first plurality of cells, the first plurality of cells using a first radio access technology (RAT);
code for receiving a second set of location measurements obtained by the mobile device for second PRSs transmitted in a second plurality of cells, the second plurality of cells using a second RAT, wherein the first RAT and the second RAT are different radio access technologies operating on the same radio frequency band, with the first set of location measurements corresponding to first PRS positioning occasions of the first PRSs scheduled for occurrence at the same time with second PRS positioning occasions of the second PRSs corresponding to the second set of location measurements; and
code for determining a location of the mobile device based at least in part on the first set of location measurements and the second set of location measurements.

32. The non-transitory processor-readable storage medium of claim 31, further comprising code for sending assistance data to the mobile device, the assistance data including a configuration of each PRS in the first PRSs and the second PRSs, the configuration including an indication of a sequence of PRS positioning occasions and orthogonal characteristics for the each PRS, wherein the first set of location measurements and the second set of location measurements are obtained by the mobile device based in part on the configuration of each PRS in the first PRSs and the second PRSs.

* * * * *